(12) United States Patent
Choi et al.

(10) Patent No.: US 9,225,176 B2
(45) Date of Patent: Dec. 29, 2015

(54) APPARATUS AND METHOD FOR HIGH EFFICIENCY VARIABLE POWER TRANSMISSION

(75) Inventors: Jin Sung Choi, Gimpo-si (KR); Young Tack Hong, Seongnam-si (KR); Sang Wook Kwon, Seongnam-si (KR); Yun Kwon Park, Dongducheon-si (KR); Young Goo Yang, Suwon-si (KR); Eun Seok Park, Suwon-si (KR); Ki Young Kim, Yongin-si (KR); Young Ho Ryu, Yongin-si (KR); Nam Yun Kim, Seoul (KR); Dong Zo Kim, Yongin-si (KR)

(73) Assignees: Samsung Electronics Co., Ltd., Suwon-si (KR); SUNGKYUNKWAN UNIVERSITY FOUNDATION FOR CORPORATE COLLABORATION, Suwon-si (KR)

(*) Notice: Subject to any disclaimer, the term of this patent is extended or adjusted under 35 U.S.C. 154(b) by 828 days.

(21) Appl. No.: 13/396,777

(22) Filed: Feb. 15, 2012

(65) Prior Publication Data

US 2012/0235507 A1 Sep. 20, 2012

(30) Foreign Application Priority Data

Feb. 15, 2011 (KR) .......................... 10-2011-0013392
Sep. 9, 2011 (KR) .......................... 10-2011-0091685

(51) Int. Cl.
*H01F 38/14* (2006.01)
*H02J 5/00* (2006.01)
*H02J 7/02* (2006.01)

(52) U.S. Cl.
CPC ........ *H02J 5/005* (2013.01); *H02J 7/025* (2013.01)

(58) Field of Classification Search
None
See application file for complete search history.

(56) References Cited

U.S. PATENT DOCUMENTS

| 4,717,863 | A | 1/1988 | Zeiler |
| 5,722,057 | A | 2/1998 | Wu |
| 7,064,606 | B2 | 6/2006 | Louis |
| 7,768,353 | B2 | 8/2010 | Chang et al. |
| 2007/0167999 | A1* | 7/2007 | Breden et al. .......... 607/88 |

(Continued)

FOREIGN PATENT DOCUMENTS

| CN | 2904435 Y | 5/2007 |
| CN | 101295887 A | 10/2008 |

(Continued)

OTHER PUBLICATIONS

International Search Report issued Sep. 28, 2012 in counterpart International Application No. PCT/KR2012/001126 (3 pages, in English).

(Continued)

*Primary Examiner* — Jared Fureman
*Assistant Examiner* — Aqeel Bukhari
(74) *Attorney, Agent, or Firm* — NSIP Law

(57) ABSTRACT

A high efficiency variable power transmitting apparatus outputs a variable power by modulating, with respect to a time axis, a high frequency signal having a constant amplitude by turning the high frequency signal ON and OFF, amplifying the variable power to satisfy a requested power level of a target device based on a supply voltage having a predetermined level, converting an alternating current (AC) voltage received from a power source to a direct current (DC) voltage, generating the supply voltage having the predetermined level based on the DC voltage, and providing the supply voltage having the predetermined level to the PA.

33 Claims, 15 Drawing Sheets

(56) References Cited

U.S. PATENT DOCUMENTS

| | | |
|---|---|---|
| 2008/0197802 A1 | 8/2008 | Onishi et al. |
| 2009/0284245 A1* | 11/2009 | Kirby et al. ............... 323/318 |
| 2010/0135177 A1 | 6/2010 | Liu et al. |
| 2010/0177757 A1 | 7/2010 | Kim et al. |
| 2011/0089921 A1* | 4/2011 | Tomita et al. ............. 323/284 |

FOREIGN PATENT DOCUMENTS

| | | |
|---|---|---|
| EP | 1 983 600 A1 | 10/2008 |
| JP | 06-061874 A | 3/1994 |
| JP | 08-191224 A | 7/1996 |
| JP | 2000-217280 A | 8/2000 |
| JP | 2003-516099 A | 5/2003 |
| JP | 2003-348776 A | 12/2003 |
| JP | 2006-166309 A | 6/2006 |
| JP | 2010-142036 A | 6/2010 |
| KR | 10-2004-0028312 A | 4/2004 |
| KR | 10-2005-0064267 A | 6/2005 |
| KR | 10-2007-0015264 A | 2/2007 |
| KR | 10-2008-0032519 A | 4/2008 |
| KR | 10-2008-0095645 A | 10/2008 |
| KR | 10-2010-0044258 A | 4/2010 |
| KR | 10-2010-0062416 A | 6/2010 |
| KR | 10-2010-0098285 A | 9/2010 |
| KR | 10-2010-0105308 A | 9/2010 |

OTHER PUBLICATIONS

Korean Office Action issued Nov. 4, 2013 in counterpart Korean Patent Application No. 10-2011-0091685. (4 pages in Korean).

Chinese Office Action issued by the State Intellectual Property Office on Apr. 13, 2015 for the corresponding Chinese Application No. 201280018589.7 (14 pages in English, 10 pages in Chinese).

Office Action issued on Oct. 27, 2015 in the corresponding Japanese Patent Application No. 2013-553375, 4 pages in English, 5 pages in Japanese.

* cited by examiner

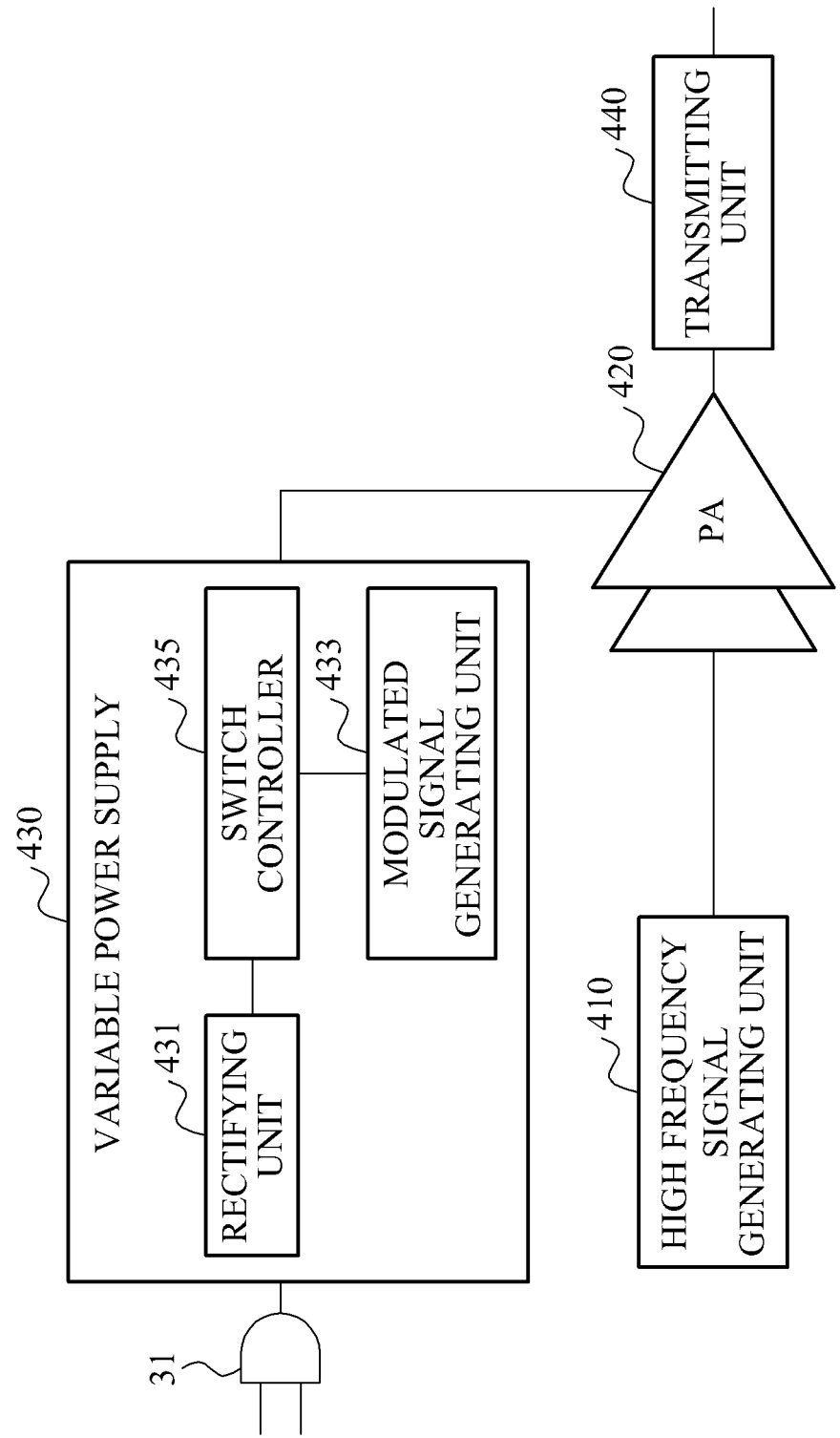

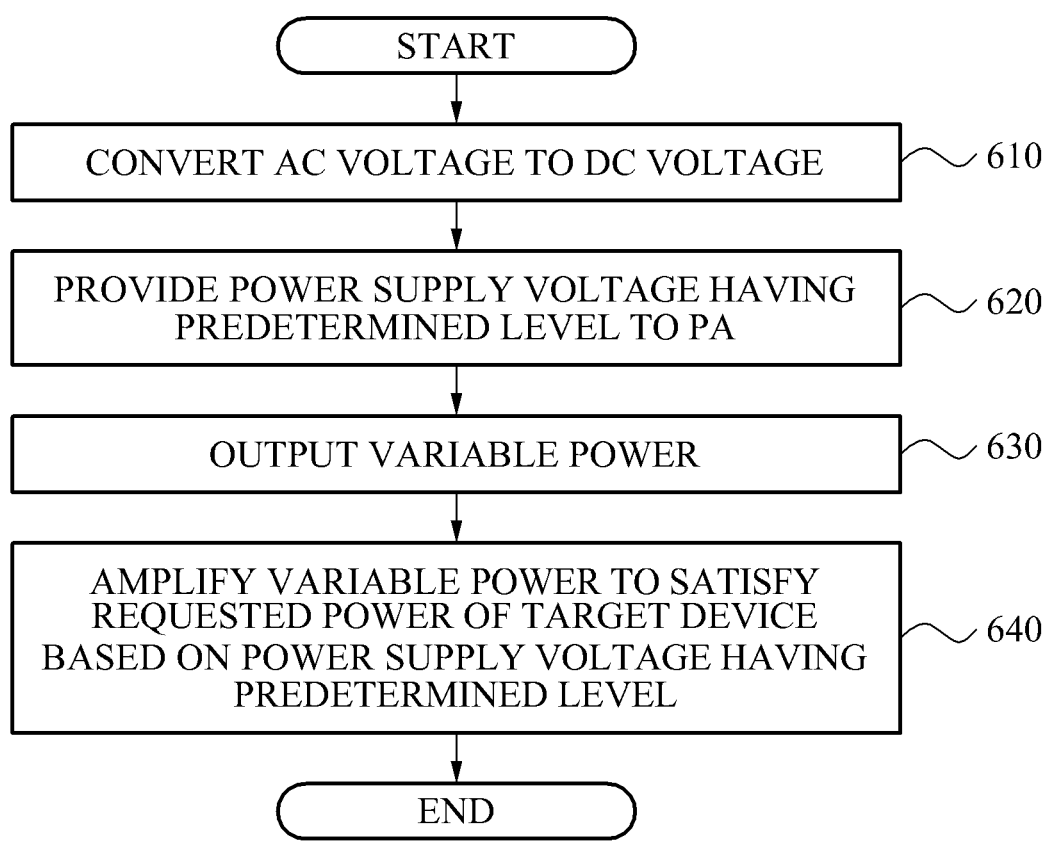

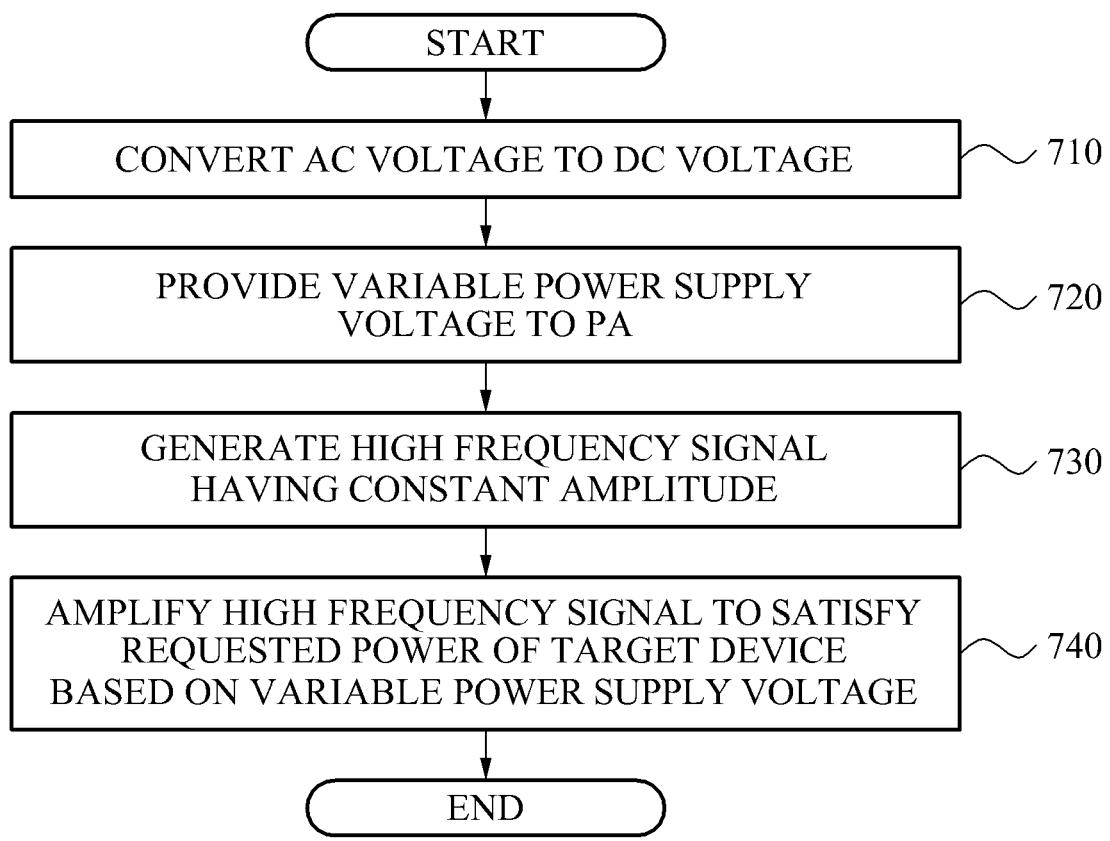

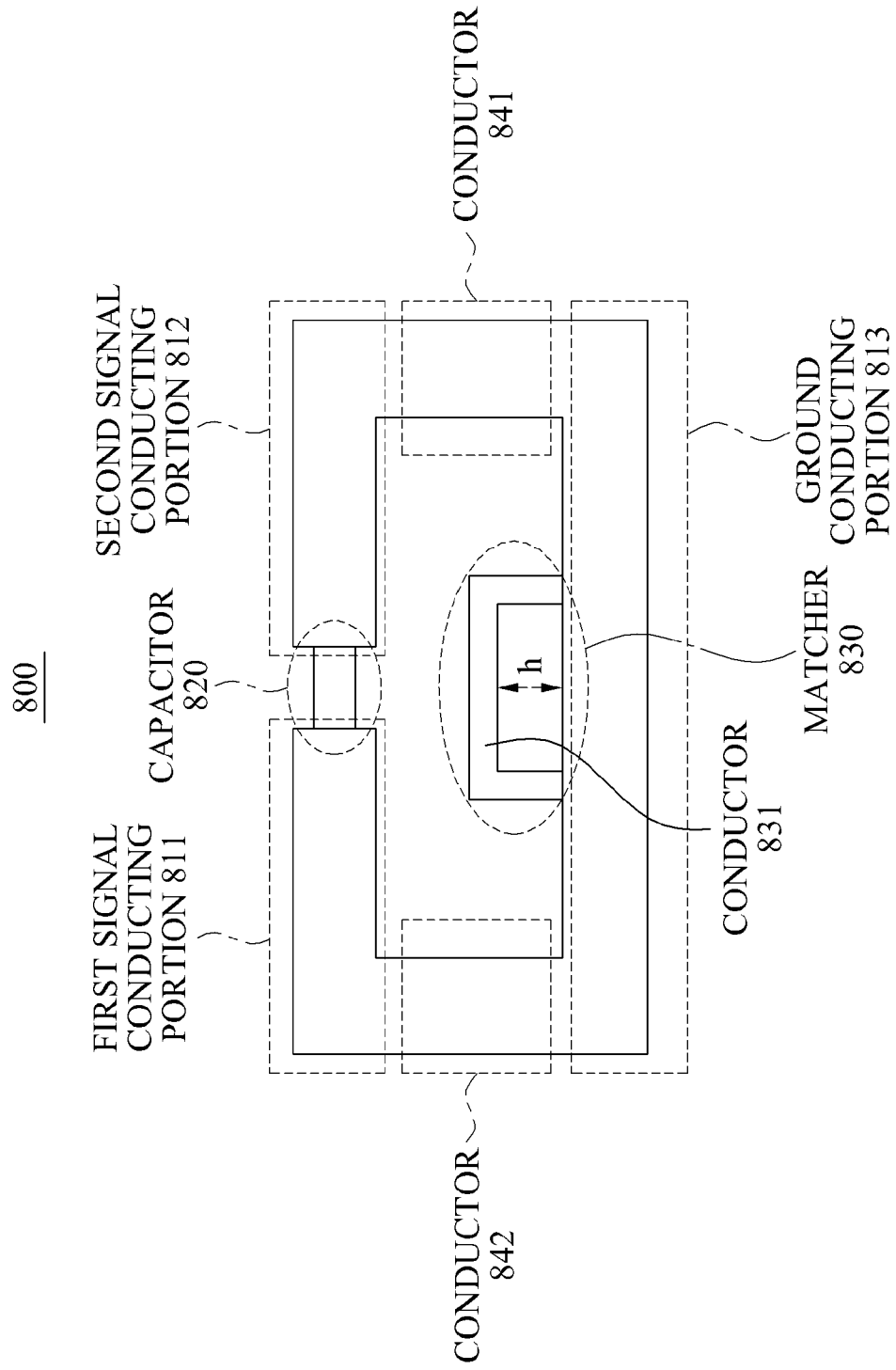

APPARATUS AND METHOD FOR HIGH EFFICIENCY VARIABLE POWER TRANSMISSION

CROSS-REFERENCE TO RELATED APPLICATIONS

This application claims the benefit of Korean Application No. 10-2011-0013392 filed on Feb. 15, 2011 and 10-2011-0091685 filed Sep. 9, 2011, in the Intellectual Property Office, the entire disclosure of which is incorporated herein by reference for all purposes.

BACKGROUND

1. Field

The following description relates to variable power transmission using wireless power.

2. Description of Related Art

As demand for portable electrical devices has rapidly increased, use of wired power supplies for these devices has become increasingly inconvenient. Studies on wireless power transmission have been conducted to overcome the inconveniences of wired power supplies and the limited capacity of conventional batteries. One conventional wireless power transmission technology uses a resonance characteristic of a radio frequency (RF) device.

A wireless power transmission system that uses a resonance characteristic of an RF device may include a source that transmits power and a target that receives the transmitted power. Also, the wireless power transmission system may include a power amplifier that amplifies power from a source to satisfy a requested power level of the target. When a power level requested by the target changes, the power amplifier may need to amplify the power from the source to satisfy the requested power level.

SUMMARY

According to a general aspect, a high efficiency variable power transmitting apparatus includes a variable power generating unit configured to output a variable power by modulating, with respect to a time axis, a high frequency signal having a constant amplitude by turning the high frequency signal ON and OFF, a power amplifier (PA) configured to amplify the variable power to satisfy a requested power level of a target device based on a power supply voltage having a predetermined level, and a power supply configured to convert an alternating current (AC) voltage received from a power source to a direct current (DC) voltage, generate the power supply voltage having the predetermined level based on the DC voltage, and provide the power supply voltage having the predetermined level to the PA.

The high efficiency variable power transmitting apparatus may further include a transmitting unit configured to transmit the amplified variable power to the target device through a transmission coil or an antenna.

The variable power generating unit may include a high frequency signal generating unit configured to generate the high frequency signal having the constant amplitude, a modulated signal generating unit configured to generate a low frequency modulated signal having a duty cycle depending on the requested power of the target device, and a switch controller configured to control ON and OFF states of a switch to modulate the high frequency signal based on the low frequency modulated signal to generate the variable power.

The variable power generating unit may include a high frequency signal generating unit configured to generate the high frequency signal having the constant amplitude, a modulated signal generating unit configured to generate a low frequency modulated signal having a duty cycle depending on the requested power level of the target device, and a digital logic processing unit configured to perform a logic operation to modulate the high frequency signal based on the low frequency modulated signal to generate the variable power.

The variable power generating unit may include a high frequency signal generating unit configured to generate the high frequency signal having the constant amplitude, a modulated signal generating unit configured to generate a low frequency modulated signal having a duty cycle depending on the requested power level of the target device, and a controller configured to control operation of the high frequency signal generating unit based on the low frequency modulated signal to generate the variable power.

The modulated signal generating unit may generate the low frequency modulated signal by performing delta-sigma modulation.

The power supply may include a rectifying unit configured to rectify the AC voltage to generate the DC voltage.

The power supply may include a transforming unit configured to transform the AC voltage received from the power source to an AC voltage having a level corresponding to a rated voltage of the PA, and a rectifying unit configured to rectify the AC voltage having the level corresponding to the rated voltage of the PA to generate the DC voltage.

The PA may be configured to operate in a switching mode or a saturated mode as an amplifier having a class selected from the group consisting of class D, class E, class F, class E/F, inverse class D, inverse class E, and inverse class F.

The PA may comprise at least one power device selected from the group consisting of a gallium nitride (GaN) power device, a silicon carbide (SiC) power device, a lateral double diffused metal oxide semiconductor (LDMOS) power device, and a metal oxide semiconductor field effect transistor (MOSFET).

According to a general aspect, a high efficiency variable power transmitting apparatus includes a high frequency signal generating unit configured to generate a high frequency signal having a constant amplitude, a power amplifier (PA) configured to amplify the high frequency signal to satisfy a requested power level of a target device based on a variable power supply voltage, and a variable power supply configured to convert an alternating current (AC) voltage received from a power source to a direct current (DC) voltage, modulate the DC voltage with respect to a time axis by turning the DC voltage ON and OFF to generate the variable power supply voltage, and provide the variable power supply voltage to the PA.

The variable power supply may include a rectifying unit configured to rectify the AC voltage to generate the DC voltage, a modulated signal generating unit configured to generate a low frequency modulated signal having a duty cycle depending on the requested power level of the target device, and a switch controller configured to control ON and OFF states of a switch to modulate the DC voltage based on the low frequency modulated signal to generate the variable power supply voltage.

The modulated signal generating unit may generate the low frequency modulated signal by performing delta-sigma modulation.

According to a general aspect, a high efficiency variable power transmitting method includes converting an alternating current (AC) voltage received from a power source to a direct current (DC) voltage, generating a power supply voltage having a predetermined level based on the DC voltage, providing the power supply voltage having the predetermined level to a power amplifier (PA), outputting a variable power by modulating, with respect to a time axis, a high frequency signal having a constant amplitude by turning the high frequency signal ON and OFF, and amplifying, using the PA, the variable power to satisfy a requested power level of a target device based on the power supply voltage having the predetermined level.

The outputting may include generating the high frequency signal having the constant amplitude, generating a low frequency modulated signal having a duty cycle depending on the requested power level of the target device, and controlling ON and OFF states of a switch to modulate the high frequency signal based on the low frequency modulated signal to generate the variable power.

The outputting may include generating the high frequency signal having the constant amplitude, generating a low frequency modulated signal having a duty cycle depending on the requested power level of the target device, and performing a logic operation to modulate the high frequency signal based on the low frequency modulated signal to generate the variable power.

The outputting of the variable power may include generating, using a high frequency signal generating unit, the high frequency signal having the constant amplitude, generating a low frequency modulated signal having a duty cycle depending on the requested power level of the target device, and controlling an operation of the high frequency signal generating unit based on the low frequency modulated signal to generate the variable power.

The generating of the low frequency modulated signal may include generating the low frequency modulated signal by generating delta-sigma modulating.

According to a general aspect, a high efficiency variable power transmitting method includes converting an alternating current (AC) voltage received from a power source to a direct current (DC) voltage, generating a variable power supply voltage by modulating the DC voltage with respect to a time axis by turning the DC voltage ON and OFF, providing the variable power supply voltage to a power amplifier (PA), generating a high frequency signal having a constant amplitude, and amplifying, using the PA, the high frequency signal to satisfy a requested power level of a target device based on the variable power supply voltage.

The generating of the variable power supply voltage may include generating a low frequency modulated signal having a duty cycle depending on the requested power level of the target device, and controlling ON and OFF states of a switch to modulate the DC voltage based on the low frequency modulated signal to generate the variable power supply voltage.

The generating of the low frequency modulated signal may include generating the low frequency modulated signal by performing delta-sigma modulation.

According to a general aspect, a variable power transmitting apparatus includes a variable power generating unit configured to output a high frequency signal having ON states and OFF states having a duty cycle depending on a requested power level of a target device, the high frequency signal having a constant amplitude during the ON states, a power supply configured to output a power supply voltage having a fixed predetermined level, and a power amplifier (PA) operated by the power supply voltage having the fixed predetermined level and configured to amplify the high frequency signal to output a variable power satisfying the requested power level of the target device.

The apparatus may further include a transmitting unit configured to transmit the variable power output from the PA to the target device through a transmission coil comprising a metamaterial or an antenna comprising a metamaterial.

The power supply may be configured to convert an alternating current (AC) voltage to a direct current (DC) voltage having the fixed predetermined level, and provide the DC voltage to the PA as the power supply voltage having the fixed predetermined level.

The PA may have a maximum efficiency when operated by the power supply voltage having the fixed predetermined level, and may have an efficiency lower than the maximum efficiency when operated by a power supply voltage having a level other than the fixed predetermined level.

According to a general aspect, a variable power transmitting apparatus includes a high frequency signal generating unit configured to output a high frequency signal having ON states and OFF states having a duty cycle depending on a requested power level of a target device, the high frequency signal having a constant amplitude during the ON states, a variable power supply configured to output a variable power supply voltage having ON states and OFF states having a duty cycle depending on a requested power level of a target device, the variable power supply voltage having a fixed predetermined level during the ON states, and a power amplifier (PA) operated by the variable power supply voltage and configured to amplify the high frequency signal to output a variable power satisfying the requested power level of the target device.

The power supply may be configured to convert an alternating current (AC) voltage to a direct current (DC) voltage having the fixed predetermined level, turn the DC voltage ON and OFF according to the requested power level of the target device to generate the variable power supply voltage, and provide the variable power supply voltage to the PA.

The PA may have a maximum efficiency when operated by a power supply voltage having the fixed predetermined level, and may have an efficiency lower than the maximum efficiency when operated by a power supply voltage having a level other than the fixed predetermined level.

Examples of an embodiment may include a wireless power transmission system that transmits an amount of power that satisfies a requested power level of a receiver that wirelessly receives power using a high efficiency variable power transmitting apparatus.

Examples of an embodiment may include a high efficiency variable power transmitting apparatus that adjusts a time period during which power is transmitted while maintaining a high frequency signal input to a PA at a constant amplitude, thereby enabling a transmitter to have a maximum efficiency even when a mean value of an output power is low.

Examples of an embodiment may include a high efficiency variable power transmitting apparatus that provides a fixed voltage to a PA, thereby enabling a configuration of a power supply supplying power to be simple and enabling the power supply to have a high efficiency.

Examples of an embodiment may include a high efficiency variable power transmitting apparatus that provides a voltage to a PA without using a DC/DC converter that converts a DC voltage to a DC voltage required by a source device, thereby enabling a configuration of the power supply to become simple.

Other features and aspects will be apparent to one of ordinary skill in the art from the following detailed description, the drawings, and the claims.

BRIEF DESCRIPTION OF THE DRAWINGS

FIG. 4 is a block diagram illustrating a high efficiency variable power transmitting apparatus according to an example of an embodiment.

FIG. 6 is a flowchart illustrating a high efficiency variable power transmitting method according to an example of an embodiment.

FIG. 7 is a flowchart illustrating a high efficiency variable power transmitting method according to an example of an embodiment.

FIGS. 8 through 13, 14A, and 14B are diagrams illustrating various resonators for wireless power transmission according to examples of an embodiment.

DETAILED DESCRIPTION

Figure 1:
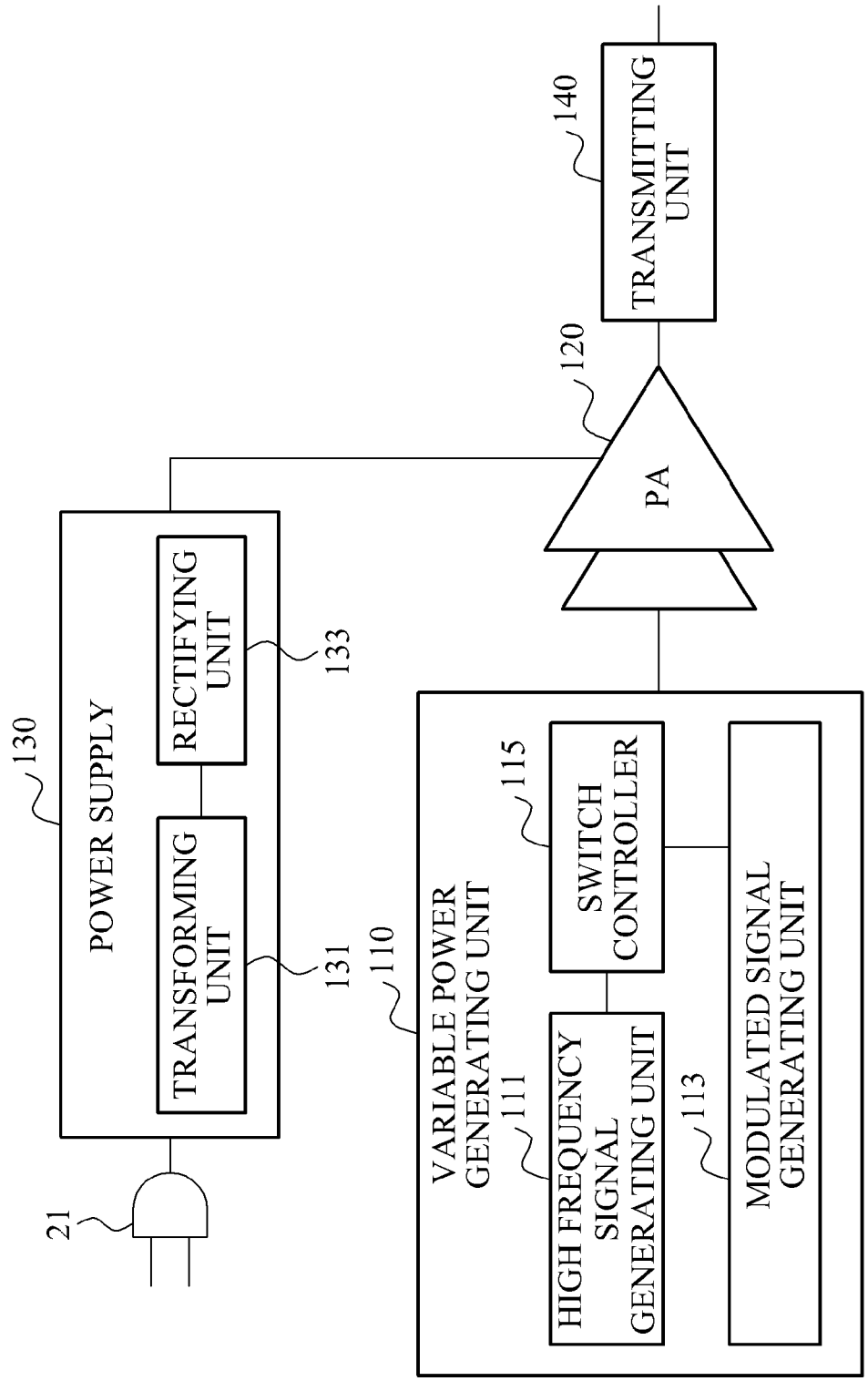
FIG. 1 is a block diagram illustrating a high efficiency variable power transmitting apparatus according to an example of an embodiment.

The following detailed description is provided to assist the reader in gaining a comprehensive understanding of the methods, apparatuses, and/or systems described herein. Accordingly, various changes, modifications, and equivalents of the systems, apparatuses, and/or methods described herein may be suggested to those of ordinary skill in the art. Any specific sequences of processing steps and/or operations described are merely examples, and the sequences of processing steps and/or operations are not limited to those set forth herein and may be changed as is known in the art, with the exception of processing steps and/or operations necessarily occurring in a certain order. Also, descriptions of well-known functions and constructions may be omitted for increased clarity and conciseness.

Throughout the drawings and the detailed description the same reference numerals refer to the same elements, features, and structures. The relative size and depiction of these elements may be exaggerated for clarity, illustration, and convenience.

Generally, in a wireless power transmission system, a power supply that supplies a supply voltage to a power amplifier (PA) may be a switching-mode power supply (SMPS). The SMPS may convert an alternating current (AC) voltage of 110 volts (V) or 220 V to a DC voltage required for stable operation of the PA, and may provide the DC voltage to the PA as an operating power.

The SMPS may be configured to include a DC converter and a DC/DC converter, in which case a size of the SMPS may be relatively large, and it may be difficult to fabricate the SMPS.

A wireless power transmission system may need to receive a transmission of power that varies based on a state of a receiver or an external environment of the receiver. In this example, when an amount of input power input to the PA decreases to change an output power, transmission efficiency may dramatically decrease.

To transmit the variable power with a constant transmission efficiency, a method of changing an output power of the PA by changing an output voltage of the SMPS may be considered. However, designing a PA that provides a maximum efficiency based on a variable power supply voltage is not easily accomplished. A configuration of a conventional SMPS is complex and a size of the conventional SMPS is large. Therefore, when a new function of outputting a variable power is added, the configuration of the SMPS may become even more complex and the efficiency of the SMPS may decrease.

Examples of embodiments that provide a method of generating a variable power while maintaining a supply voltage or an input voltage of the PA at a constant value are described below. In the following description, a source device is an apparatus including a transmitter transmitting wireless power, and a target device is an apparatus including a receiver receiving wireless power.

FIG. 1 illustrates a high efficiency variable power transmitting apparatus according to an example of an embodiment.

Referring to FIG. 1, the high efficiency variable power transmitting apparatus includes a variable power generating unit 110, a PA 120, a power supply 130, and a transmitting unit 140.

The variable power generating unit 110 is configured to modulate a high frequency signal having a constant amplitude with respect to a time axis. The variable power generating unit 110 generates a variable power by modulating a high frequency signal generated by a high frequency signal generating unit 111 by turning the high frequency signal ON and OFF. In this example, the variable power generating unit 110 generates the variable power by modulating the high frequency signal based on a modulated signal that determines durations of ON and OFF states of the high frequency signal. For example, the high frequency signal may have a frequency of 13.56 MHz or 6.78 MHz.

The variable power generating unit 110 includes the high frequency signal generating unit 111, a modulated signal generating unit 113, and a switch controller 115.

The high frequency signal generating unit 111 is configured to generate a high frequency signal having a constant amplitude. The high frequency signal generating unit 111 supplies the high frequency signal having the constant amplitude to the PA 120.

The modulated signal generating unit 113 is configured to generate a low frequency modulated signal having a duty cycle depending on a requested power level of a target device. The modulated signal generating unit 113 determines durations of ON and OFF states of the high frequency signal to generate the low frequency modulated signal. The modulated signal generating unit 113 may determine the duty cycle to correspond to the requested power level within a predetermined period to generate the low frequency modulated signal. For example, the low frequency modulated signal may have a frequency that is lower than the frequency of the high frequency modulated signal, such as 1/100 of the frequency of the high frequency signal. In an example where the high frequency signal has a frequency of 13.56 MHz as discussed above, the low frequency modulated signal may have a frequency of 0.1356 MHz, or 135.6 kHz. In an example where the high frequency signal has a frequency of 6.78 MHz as discussed above, the low frequency modulated signal may have a frequency of 0.0678 MHz, or 67.8 kHz. The length of the predetermined period determines how frequently the duty cycle of the low frequency modulated signal is updated by the modulated signal generating unit 113, and thus determines how frequently the variable power generated by the variable power generating unit 110 is updated. The shorter the predetermined period is, the more quickly the variable power generating unit 110 can update the variable power that it is generating.

For example, when the requested power level is a maximum power level, the modulated signal generating unit 113 may determine the duty cycle to be 100% so that the low frequency modulated signal is maintained in a high state during the predetermined period. In this example, the high frequency signal is continuously input to the PA 120 during the predetermined period. Therefore, an output power level of the PA 120 is a maximum power level during the predetermined period.

When the requested power level is a minimum power level, the modulated signal generating unit 113 may determine the duty cycle to be 0% so that the low frequency modulated signal is maintained in a low state during predetermined period. In this example, the high frequency signal is not input to the PA 120 during the predetermined period. Therefore, the output power level of the PA 120 is a minimum power level during the predetermined period.

The modulated signal generating unit 113 may generate the low frequency modulated signal having the duty cycle depending on the requested power level of the target device by performing delta-sigma modulation. The modulated signal generating unit 113 may generate the low frequency modulated signal by determining the durations of ON and OFF states of the high frequency signal by performing the delta-sigma modulation.

The switch controller 115 controls ON and OFF states of a switch to modulate the high frequency signal generated by the high frequency signal generating unit 111 based on the low frequency modulated signal generated by the modulated signal generating unit 113. The switch controller 115 may control the switch to be turned ON when the low frequency modulated signal is in a high state, and may control the switch to be turned OFF when the low frequency modulated signal is in a low state.

The high frequency signal is input to the PA 120 based on the determined durations of the ON and OFF states. In this example, the high frequency signal has a constant amplitude. The high frequency signal input having the constant amplitude is input to the PA 120. A mean value of the output power that is amplified and output from the PA 120 varies based on the durations of the ON and OFF states or the duty cycle. The PA 120 outputs a variable power that varies based on the durations of the ON and OFF states or the duty cycle. Even though the PA 120 receives the high frequency signal having the constant amplitude, the PA 120 outputs the variable power having the mean value that varies based on the durations of the ON and OFF states or the duty cycle.

The PA 120 amplifies the variable power generated by the variable power generating unit 110 to satisfy the requested power level of the target device based on a power supply voltage having a predetermined level. In this example, the power supply voltage is maintained at a predetermined level. Therefore, the PA 120 may amplify, with high efficiency, the variable power output from the variable power generating unit 110.

The PA 120 may be configured to operate in a switching mode or a saturated mode as an amplifier having a class selected from the group consisting of class D, class E, class F, class E/F, inverse class D, inverse class E, and inverse class F to minimize a power loss in a power device of the PA 120.

Also, the PA 120 may be configured to include at least one power device selected from the group consisting of a gallium nitride (GaN) power device, a silicon carbide (SiC) power device, a lateral double diffused metal oxide semiconductor (LDMOS) power device, and a metal oxide semiconductor field effect transistor (MOSFET) so that an efficiency of the PA 120 and an output characteristic of the PA 120 may be improved.

The power supply 130 converts an AC voltage received from a power source 21 to a DC voltage. The power supply 130 generates a power supply voltage having a predetermined level based on the DC voltage. The power supply 130 provides the power supply voltage having the predetermined level to the PA 120.

The power supply 130 may be configured as a conventional SMPS.

Alternatively, the power supply unit 130 may be configured to include a transforming unit 131 and a rectifying unit 133 instead of being configured as a complex SMPS.

The transforming unit 131 is configured to transform the AC voltage received from the power source 21 to an AC voltage having a level corresponding to a rated voltage of the PA 120. For example, the transforming unit 131 may transform an AC voltage of 220 V to an AC voltage having a low voltage corresponding to the rated voltage of the PA 120. The transforming unit 131 may be configured as a 1:N transformer.

The rectifying unit 133 is configured to rectify the AC voltage having the low voltage corresponding to the rated voltage of the PA 120 to generate the DC voltage. The DC voltage generated by the rectifying unit 133 is provided to the PA 120 as the power supply voltage having the predetermined level. In this example, the DC voltage has a fixed value equal to the predetermined level and may be stably provided to the PA 120.

Alternatively, the power supply 130 may only include the rectifying unit 133. In this example, the rectifying unit 133 rectifies the AC voltage received from the power source 21 to generate the DC voltage. The DC voltage generated by the rectifying unit 133 is provided to the PA 120 as the power supply voltage having the predetermined level.

The transmitting unit 140 is configured to transmit, to the target device through a transmission coil or an antenna, the variable power amplified by the PA 120 to satisfy the requested power level of the target device. The transmitting unit 140 transmits the amplified variable power output from the PA 120 through the transmission coil or the antenna.

Figure 2:
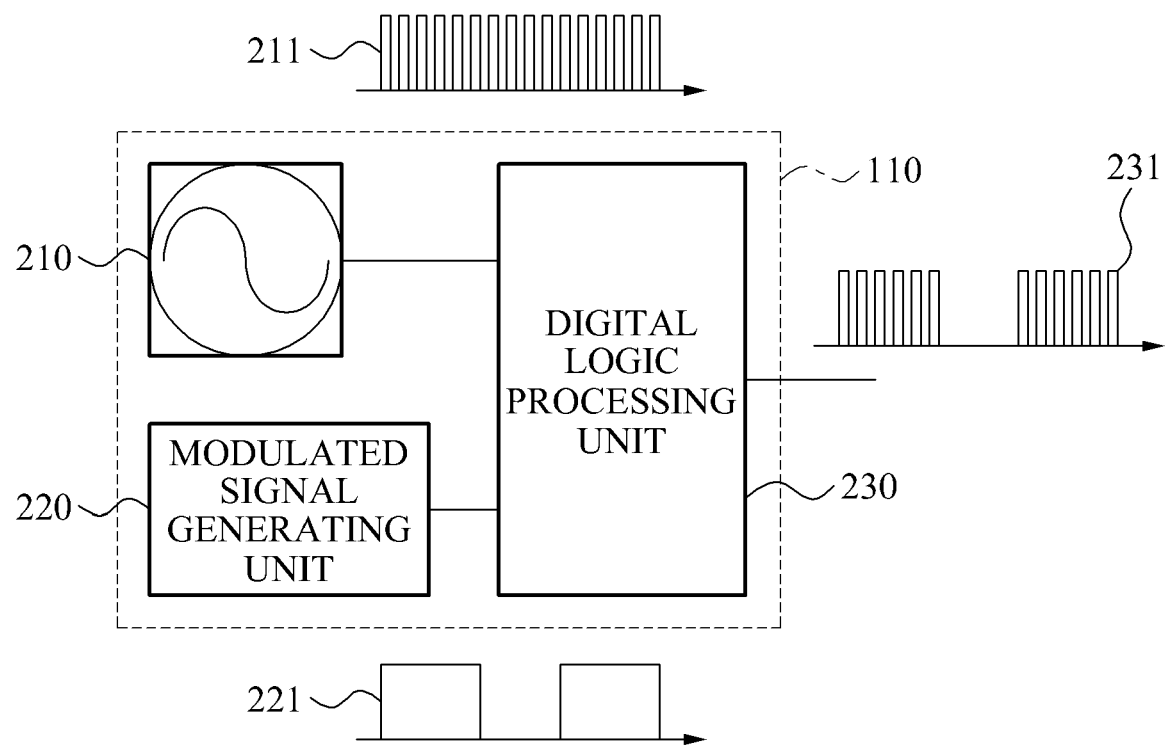
FIG. 2 is a block diagram illustrating a variable power generating unit according to an example of an embodiment.

FIG. 2 illustrates the variable power generating unit 110 according to an example of an embodiment.

Referring to FIG. 2, the variable power generating unit 110 includes a high frequency signal generating unit 210, a modulated signal generating unit 220, and a digital logic processing unit 230.

The high frequency signal generating unit 210 is configured to generate a high frequency signal 211 having a constant amplitude.

The modulated signal generating unit 220 is configured to generate a low frequency modulated signal 221 having a duty cycle depending on a requested power level of a target device. The modulated signal generating unit 220 generates the low frequency modulated signal 221 so that the high frequency signal 211 having a constant amplitude is modulated based on the duty cycle of the low frequency modulated signal 221. The high frequency signal 211 output from the high frequency signal generating unit 210 maintains the constant amplitude, and is input to the PA 120 based on the duty cycle of the low frequency modulated signal 221.

The modulated signal generating unit 220 may be configured to generate the low frequency modulated signal 211 by performing delta-sigma modulation.

The modulated signal generating unit 220 may be configured to generate the low frequency modulated signal 211 that is modulated with respect to a time axis based on various schemes that will be apparent to those of ordinary skill in the art of pulse width modulation (PWM).

The digital logic processing unit 230 is configured to perform a logic operation so that the high frequency signal 211 generated by the high frequency signal generating unit 210 is modulated based on the low frequency modulated signal 221 generated by the modulated signal generating unit 220. The digital logic processing unit 230 may be configured to perform a logic operation in which when the low frequency modulated signal 221 is in an ON state, the high frequency signal 211 is output, thereby outputting a variable power 231. For example, the digital logic processing unit 230 may be configured as a simple AND gate. The digital logic processing unit 230 may be configured to perform a more complex logic operation that performs the same function as the simple AND gate.

Figure 3:
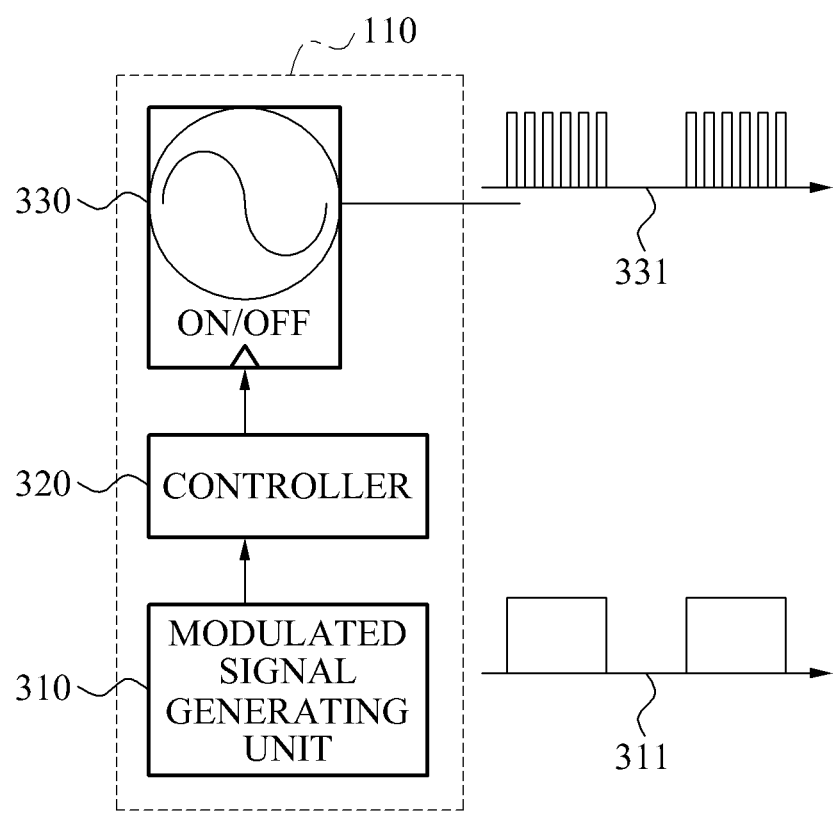
FIG. 3 is a block diagram illustrating a variable power generating unit according to an example of an embodiment.

FIG. 3 illustrates the variable power generating unit 110 according to an example of an embodiment.

Referring to FIG. 3, the variable power generating unit 110 includes a modulated signal generating unit 310, a controller 320, and a high frequency signal generating unit 330.

The modulated signal generating unit 310 is configured to generate a low frequency modulated signal 311 having a duty cycle depending on a requested power level of a target device. The modulated signal generating unit 310 may generate the low frequency modulated signal 311 so that a high frequency signal 331 having a constant amplitude generated by the high frequency signal generating unit 330 is modulated with respect to a time axis based on durations of ON and OFF states of the low frequency modulated signal 311. The high frequency signal 331 output from the high frequency signal generating unit 330 maintains the constant amplitude when the high frequency signal 331 is input to the PA 120, thereby maintaining a high power transmission efficiency.

The modulated signal generating unit 310 may be configured to generate the low frequency modulated signal 311 by performing delta-sigma modulation.

The controller 320 controls an operation of the high frequency signal generating unit 330 based on the low frequency modulated signal 311 generated by the modulated signal generating unit 310. The controller 320 electronically controls ON and OFF states of the high frequency signal generating unit 330 when the low frequency modulated signal 311 is input to the controller 320. In this example, the high frequency signal generating unit 330 outputs the high frequency signal 331 having a constant amplitude based on ON states of the low frequency modulated signal 311.

FIG. 4 illustrates a high efficiency variable power transmitting apparatus according to an example of an embodiment.

Referring to FIG. 4, the high efficiency variable power transmitting apparatus includes a high frequency signal generating unit 410, a PA 420, a variable power supply 430, and a transmitting unit 440.

The high frequency signal generating unit 410 is configured to generate a high frequency signal having a constant amplitude.

The PA 420 amplifies, based on a variable power supply voltage, the high frequency signal generated by the high frequency signal generating unit 410 to satisfy a requested power level of a target device. An instantaneous value of the variable power supply voltage in an ON state of the variable power supply voltage is a predetermined level, whereas a mean value of the variable power supply voltage varies through modulation of the variable power supply voltage with respect to a time axis based on ON and OFF states of the variable power supply voltage. Thus, the PA 420 receives a variable power supply voltage having a predetermined level in an ON state of the variable power supply voltage, and therefore is able to amplify the high frequency signal with a high efficiency.

The PA 420 may be configured to operate in a switching mode or a saturated mode to minimize a loss of a power device of the PA as an amplifier having a class selected from the group consisting of Class D, Class E, Class F, Class E/F, inverse Class D, inverse Class E, and inverse Class F.

Also, the PA 420 may be configured to include at least one power device selected from the group consisting of a GaN power device, a SiC power device, an LDMOS power device, and a MOSFET so that an efficiency of the PA 120 and an output characteristic of the PA 120 may be improved.

The variable power supply 430 converts an AC voltage received from a power source 31 to a DC voltage. The variable power supply 430 modulates the DC voltage with respect to a time axis by turning the DC voltage ON and OFF. The variable power supply 430 generates a variable power supply voltage based on the modulated DC voltage and supplies the generated variable power supply voltage to the PA 420. In this example, the variable power supply 430 generates the variable power supply voltage by modulating the DC voltage based on a low frequency modulated signal that determines durations of ON and OFF states of the variable power supply voltage.

The variable power supply 430 includes a rectifying unit 431, a modulated signal generating unit 433, and a switch controller 435.

The rectifying unit 431 is configured to rectify the AC voltage received from the power source 31 to generate the DC voltage.

The modulated signal generating unit 433 is configured to generate a low frequency modulated signal having a duty cycle depending on the requested power level of the target device. The modulated signal generating unit 433 generates the low frequency modulated signal by determining durations of ON and OFF states of the DC voltage. The modulated signal generating unit 433 may generate the low frequency modulated signal by determining a duty cycle depending on a level of the requested power level of the target device within a predetermined period.

For example, when the requested power level is a maximum power level, the modulated signal generating unit 433 may enable the low frequency modulated signal to be in a high state continuously during the predetermined period. In this example, the DC voltage generated by the rectifying unit 431 is input to the PA 420 continuously during the predetermined period. Therefore, an output power level of the PA 420 is a maximum power level during the predetermined period.

When the requested power level is a minimum power level, the modulated signal generating unit 433 may enable the low frequency modulated signal to be in a low state continuously during the predetermined period. In this example, the DC voltage generated by the rectifying unit 431 is not input to the PA 420 during the predetermined period. Therefore, the output power level of the PA 420 is zero, that is, a minimum power level, during the predetermined period.

The modulated signal generating unit 433 may generate the low frequency modulated signal having the duty cycle depending on the requested power level of the target device by performing delta-sigma modulation.

The switch controller 435 controls ON and OFF states of a switch so that a DC voltage generated by the rectifying unit 431 is modulated based on the low frequency modulated signal generated by the modulated signal generating unit 433. The switch controller 435 may control the switch to be turned ON when the low frequency modulated signal is in a high state, and may control the switch to be turned OFF when the low frequency modulated signal is in a low state.

The variable power supply 430 may include a transforming unit (not illustrated, but similar to the transforming unit 131 in FIG. 1). The transforming unit transforms the AC voltage received from the power source 31 to an AC voltage having a level corresponding to a rated voltage of the PA 420. For example, the transforming unit (not illustrated) may transform an AC voltage of 220 V to a low voltage corresponding to the rated voltage of the PA 420. The transforming unit (not illustrated) may be configured as a 1:N transformer.

The transmitting unit 440 is configured to transmit, to the target device through a transmission coil or an antenna, the variable power amplified by the PA 420 to satisfy the requested power level of the target device. The transmitting unit 440 transmits the variable power output from the PA 420 through the transmission coil or the antenna.

Figure 5A:
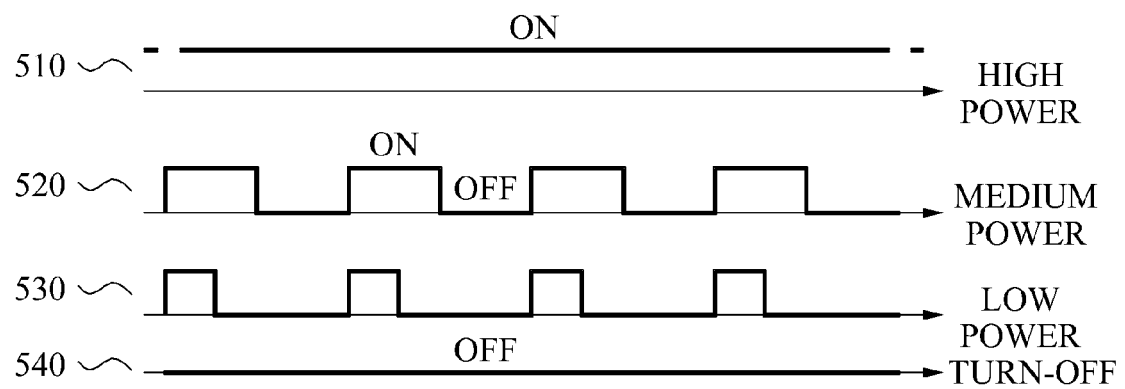
FIGS. 5A and 5B are diagrams illustrating an input voltage and an output voltage of a power amplifier in a high efficiency variable power transmitting apparatus according to an example of an embodiment.
Figure 5B:
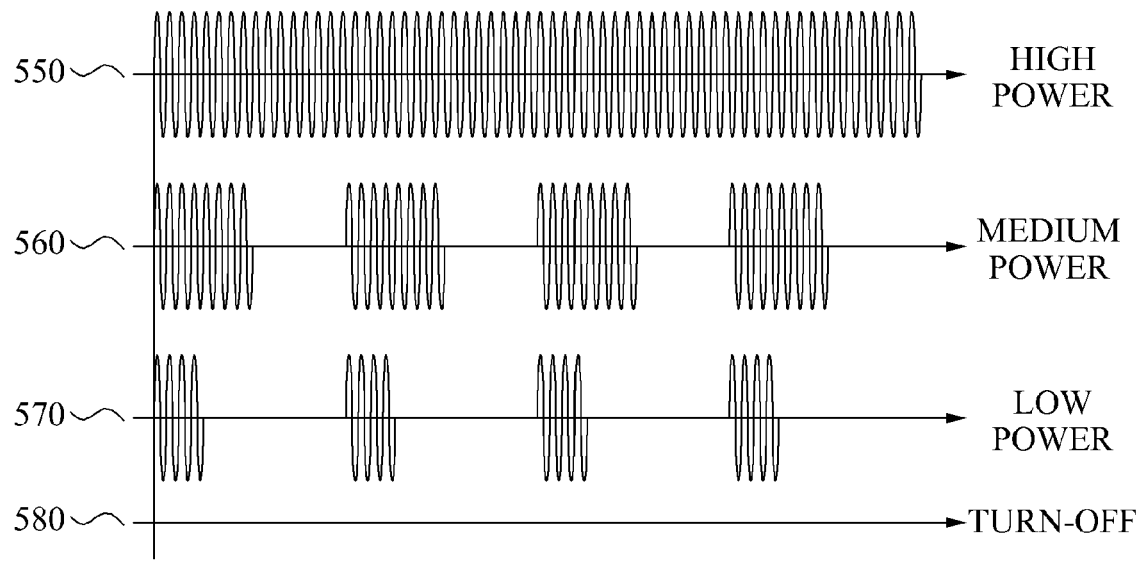

FIGS. 5A and 5B illustrate an input voltage and an output voltage of a PA in a high efficiency variable power transmitting apparatus according to an example of an embodiment.

A modulated signal having a duty cycle depending on a requested power level of a target device is illustrated in FIG. 5A, and a variable power output produced by the modulated signal is illustrated in FIG. 5B.

Referring to FIG. 5A, when the requested power level of the target device is a high power 510, the modulated signal is continuously maintained in a high state. When the requested power level of the target device is a medium power 520 or a low power 530, durations of the ON states of the modulated signal or a duty cycle associated with the high state decrease depending on the requested power level. When the requested power level of the target device is zero, that is, turn-off 540, wireless power does not need to be transmitted, and therefore the modulated signal is continuously maintained in a low state.

Referring to FIG. 5B, a high frequency signal having a constant amplitude is modulated based on each modulated signal in FIG. 5A. When the requested power level of the target device is a high power 550, a PA continuously outputs power during a period in which the modulated signal is continuously maintained in a high state. Therefore, an output power may be a maximum power level. When the requested power level of the target device is changed to a medium power 560 or a low power 570, a period in which the modulated signal is maintained in a high state decreases, and therefore a mean value of the output power decreases. When the requested power level of the target device is zero, that is, turn-off 580, wireless power does not need to be transmitted, and therefore the modulated signal is continuously maintained in a low state and the PA does not output power. Thus, the PA outputs a variable power based on the durations of the ON states of the modulated signal or the duty cycle of the modulated signal.

FIG. 6 illustrates a high efficiency variable power transmitting method according to an example of an embodiment.

In operation 610, the high efficiency variable power transmitting apparatus converts an AC voltage received from a power source to a DC voltage. The high efficiency variable power transmitting apparatus may convert the AC voltage to the DC voltage using a rectifier. Alternatively, the high efficiency variable power transmitting apparatus may convert the AC voltage to the DC voltage using a DC/AC converter.

In operation 620, the high efficiency variable power transmitting apparatus generates a power supply voltage having a predetermined level based on the DC voltage, and provides the power supply voltage having the predetermined level to the PA.

In operation 630, the high efficiency variable power transmitting apparatus outputs a variable power by modulating, with respect to a time axis, a high frequency signal having a constant amplitude by turning the high frequency signal ON and OFF.

According to an example of an embodiment, the high efficiency variable power transmitting apparatus generates a high frequency signal having a constant amplitude. The high efficiency variable power transmitting apparatus generates a low frequency modulated signal having a duty cycle depending on a requested power level of a target device. In this example, the duty cycle may be determined based on durations in which the high frequency signal is turned ON within a predetermined period. The high efficiency variable power transmitting apparatus controls ON and OFF states of a switch to modulate the high frequency signal based on the low frequency modulated signal to generate the variable power.

According to an example of an embodiment, the high efficiency variable power transmitting apparatus generates a high frequency signal having a constant amplitude. The high efficiency variable power transmitting apparatus generates a low frequency modulated signal having a duty cycle depending on a requested power level of the target device, and performs a logic operation to modulate the high frequency signal based on the low frequency modulated signal to generate the variable power.

According to an example of an embodiment, the high efficiency variable power transmitting apparatus generates, using a high frequency signal generating unit, a high frequency signal having a constant amplitude, generates a low frequency modulated signal having a duty cycle depending on a requested power level of the target device, and controls an operation of the high frequency signal generating unit based on the low frequency modulated signal to generate the variable power.

According to an example of an embodiment, the high efficiency variable power transmitting apparatus generates the low frequency modulated signal by performing delta-sigma modulation.

In operation 640, the high efficiency variable power transmitting apparatus amplifies the variable power to satisfy the requested power level of the target device based on the power supply voltage having the predetermined level.

FIG. 7 illustrates a high efficiency variable power transmitting method according to an example of an embodiment.

In operation 710, the high efficiency variable power transmitting apparatus converts an AC voltage received from a power source to a DC voltage.

In operation 720, the high efficiency variable power transmitting apparatus generates a variable power supply voltage by modulating the DC voltage with respect to a time axis by turning the DC voltage ON and OFF, and provides the variable power supply voltage to a PA.

According to an example of an embodiment, the high efficiency variable power transmitting apparatus generates a low frequency modulated signal having a duty cycle depending on a requested power level of a target device, and controls ON and OFF states of a switch to modulate the DC voltage based on the low frequency modulated signal to generate the variable power supply voltage.

According to an example of an embodiment, the high efficiency variable power transmitting apparatus generates the low frequency modulated signal by performing delta-sigma modulation.

In operation 730, the high efficiency variable power transmitting apparatus generates a high frequency signal having a constant amplitude.

In operation 740, the high efficiency variable power transmitting apparatus amplifies the high frequency signal to satisfy the requested power level of the target device based on the variable power supply voltage.

The high efficiency variable power transmitting method may be applicable to a product or a system that performs wireless transmission using a source resonator and/or a target resonator that may be configured as a helix coil structured resonator, a spiral coil structured resonator, a meta-structured resonator, or the like.

Hereinafter, related terms will be described for concise understanding. Some or all of the materials used to fabricate a resonator may have a unique relative magnetic permeability mu ($\mu_r$) (hereinafter simply magnetic permeability) and/or a unique relative permittivity epsilon ($\epsilon_r$) (hereinafter simply permittivity). The magnetic permeability is a ratio between a magnetic flux density produced by a given magnetic field in a corresponding material and a magnetic flux density produced by the given magnetic field in a vacuum. The permittivity is a ratio between an electric flux density produced by a given electric field in a corresponding material and an electric flux density produced by the given electric field in a vacuum. The magnetic permeability and the permittivity determine a propagation constant of a corresponding material at a given frequency or a given wavelength. An electromagnetic characteristic of the corresponding material may be determined based on the magnetic permeability and the permittivity. In particular, a material having an artificial structure and having a magnetic permeability and/or a permittivity that does not occur in nature is referred to as a metamaterial. A resonance state may easily be established in a metamaterial in a relatively large wavelength range or a relatively low frequency range even though a size of the metamaterial remains substantially the same.

FIGS. 8 through FIG. 14 illustrate examples of embodiments of a resonator.

FIG. 8 illustrates an example of an embodiment of a resonator 800 having a two-dimensional (2D) structure.

Referring to FIG. 8, the resonator 800 having the 2D structure includes a transmission line, a capacitor 820, a matcher 830, and conductors 841 and 842. The transmission line includes a first signal conducting portion 811, a second signal conducting portion 812, and a ground conducting portion 813.

The capacitor 820 is inserted in series between the first signal conducting portion 811 and the second signal conducting portion 812 so that an electric field may be established within the capacitor 820. Generally, the transmission line may include at least one conductor in an upper portion of the transmission line, and may also include at least one conductor in a lower portion of the transmission line. A current may flow through the at least one conductor disposed in the upper portion of the transmission line, and the at least one conductor disposed in the lower portion of the transmission may be electrically grounded. A conductor disposed in an upper portion of the transmission line may be separated into, and may be referred to as, the first signal conducting portion 811 and the second signal conducting portion 812. A conductor disposed in the lower portion of the transmission line may be referred to as the ground conducting portion 813.

As shown in FIG. 8, the resonator 800 has a 2D structure. The transmission line includes the first signal conducting portion 811 and the second signal conducting portion 812 in the upper portion of the transmission line, and includes the ground conducting portion 813 in the lower portion of the transmission line. The first signal conducting portion 811 and the second signal conducting portion 812 are disposed to oppose the ground conducting portion 813. The current flows through the first signal conducting portion 811 and the second signal conducting portion 812.

One end of the first signal conducting portion 811 is connected to the conductor 842, and another end of the first signal conducting portion 811 is connected to the capacitor 820. One end of the second signal conducting portion 812 is connected to the conductor 841, and another end of the second signal conducting portion 812 is connected to the capacitor 820. Accordingly, the first signal conducting portion 811, the second signal conducting portion 812, the ground conducting portion 813, and the conductors 841 and 842 are connected to each other so that the resonator 800 has a closed-loop electrical structure. The term "loop structure" may include a structure having any closed configuration, for example, a circular structure, a rectangular structure, a polygonal structure, and the like. "Having a loop structure" may indicate a closed-loop electrical structure.

As shown in FIG. 8, the capacitor 820 is inserted into an intermediate portion of the transmission line. Specifically, the capacitor 820 is inserted into a space between the first signal conducting portion 811 and the second signal conducting portion 812. The capacitor 820 may be configured as a lumped element, a distributed element, or the like. In particular, a distributed capacitor configured as a distributed element may include zigzagged conductor lines and a dielectric material having a relatively high permittivity between the zigzagged conductor lines.

When the capacitor 820 is inserted into the transmission line, the resonator 800 may have a property of a metamaterial. A metamaterial is a material having an artificial structure and having a predetermined electrical property that does not occur in nature. An electromagnetic characteristic of all materials occurring in nature may have a unique magnetic permeability or a unique permittivity. Most materials have a positive magnetic permeability or a positive permittivity. In the case of most materials, a right hand rule may be applied to an electric field, a magnetic field, and a Poynting vector, and therefore the corresponding materials may be referred to as right-handed materials (RHMs). However, the metamaterial has a magnetic permeability or a permittivity that does not occur in nature, and may be classified into an epsilon negative (ENG) material, a mu negative (MNG) material, a double negative (DNG) material, a negative refractive index (NRI) material, a left-handed material (LHM), and the like, based on a sign of the corresponding permittivity or magnetic permeability.

When a capacitance of the capacitor 820 configured as a lumped element is appropriately determined, the resonator 800 may have a characteristic of the metamaterial. The resonator 800 may have a negative magnetic permeability by appropriately adjusting the capacitance of the capacitor 820, and therefore the resonator 800 may also be referred to as an MNG resonator 800. Various criteria may be applied to determine the capacitance of the capacitor 820. For example, the various criteria may include a criterion for enabling the resonator 800 to have a characteristic of the metamaterial, a criterion for enabling the resonator 800 to have a negative magnetic permeability at a target frequency, a criterion for enabling the resonator 800 to have a zeroth order resonance characteristic at the target frequency, and the like. Based on at least one criterion among the aforementioned criteria, the capacitance of the capacitor 820 may be appropriately determined.

The resonator 800, also referred to as the MNG resonator 800, may have a zeroth order resonance characteristic of having a resonance frequency when a propagation constant is "0". If the resonator 800 has the zeroth order resonance characteristic, the resonance frequency is independent with respect to a physical size of the MNG resonator 800. By appropriately changing the capacitance of the capacitor 820, the resonance frequency of the MNG resonator 800 may be changed. Accordingly, the physical size of the MNG resonator 800 need not be changed to change the resonance frequency of the MNG resonator 800.

In a near field, the electric field is concentrated in the capacitor 820 inserted into the transmission line. Accordingly, due to the capacitor 820, the magnetic field becomes dominant in the near field. The MNG resonator 800 has a relatively high Q-factor when using the capacitor 820 configured as a lumped element, and thus it is possible to enhance an efficiency of power transmission. The Q-factor indicates a level of an ohmic loss or a ratio of a reactance with respect to a resistance in the wireless power transmission. It will be understood that the efficiency of the wireless power transmission will increase according to an increase in the ( ) factor.

The MNG resonator 800 includes the matcher 830 for impedance matching. The matcher 830 appropriately adjusts a strength of a magnetic field of the MNG resonator 800. An impedance of the MNG resonator 800 is determined by the matcher 830. A current may flow into the MNG resonator 800 via a connector (not illustrated), or may flow out of the MNG resonator 800 via the connector. The connector may be connected to the ground conducting portion 813 or the matcher 830. The power may be transferred by coupling without using a physical connection between the connector and the ground conducting portion 813 or the matcher 830.

More specifically, as shown in FIG. 8, the matcher 830 is positioned within the loop formed by the loop structure of the resonator 800. The matcher 830 adjusts the impedance of the resonator 800 by changing the physical shape of the matcher 830. For example, the matcher 830 includes a conductor 831 for the impedance matching at a location separated from the ground conducting portion 813 by a distance h. The impedance of the resonator 800 is changed by adjusting the distance h.

Although not illustrated in FIG. 8, a controller may be provided to control the matcher 830. In this case, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed, whereby the impedance of the resonator 800 may be adjusted.

As shown in FIG. 8, the matcher 830 may be configured as a passive element such as the conductor 831. Depending on an embodiment, the matcher 830 may be configured as an active element, such as a diode, a transistor, or the like. When the active element is included in the matcher 830, the active element may be driven based on the control signal generated by the controller, and the impedance of the resonator 800 may be adjusted based on the control signal. For example, a diode as the active element may be included in the matcher 830. The impedance of the resonator 800 may be adjusted depending on whether the diode is in an on state or in an off state under the control of the control signal.

Although not illustrated in FIG. 8, a magnetic core may pass through the MNG resonator 800. The magnetic core performs a function of increasing a power transmission distance.

Figure 9:
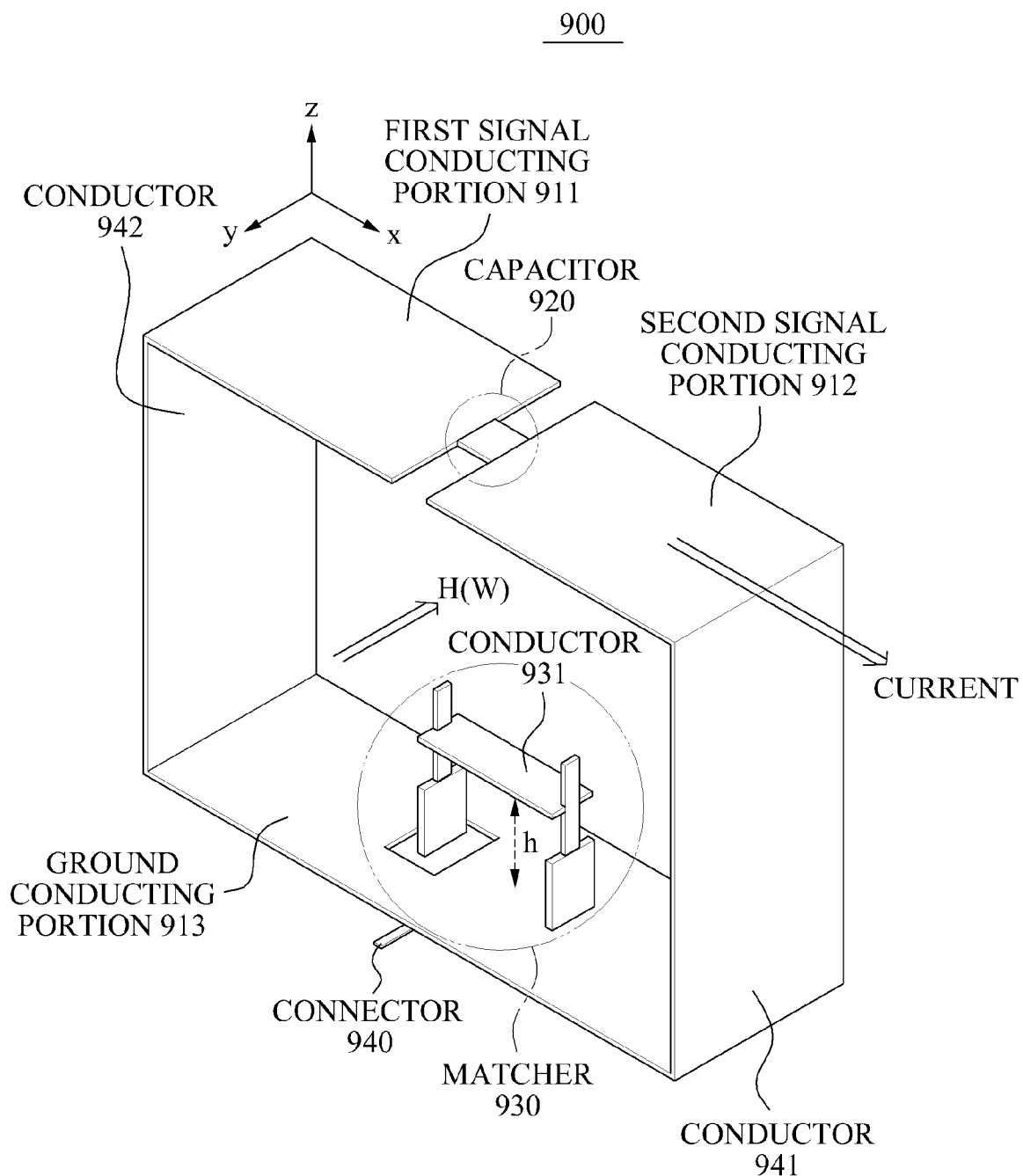

FIG. 9 illustrates an example of a resonator 900 having a three-dimensional (3D) structure.

Referring to FIG. 9, the resonator 900 having the 3D structure includes a transmission line and a capacitor 920. The transmission line includes a first signal conducting portion 911, a second signal conducting portion 912, and a ground conducting portion 913. The capacitor 920 is inserted in series between the first signal conducting portion 911 and the second signal conducting portion 912 of the transmission line, enabling an electric field to be confined within the capacitor 920.

As shown in FIG. 9, the resonator 900 may have the 3D structure. The transmission line includes the first signal conducting portion 911 and the second signal conducting portion 912 in an upper portion of the resonator 900, and includes the ground conducting portion 913 in a lower portion of the resonator 900. The first signal conducting portion 911 and the second signal conducting portion 912 are disposed to oppose the ground conducting portion 913. A current may flow in an x direction through the first signal conducting portion 911 and the second signal conducting portion 912. Due to the current, a magnetic field $H(\omega)$ may be formed in a −y direction. Alternatively, unlike the diagram of FIG. 9, the magnetic field $H(\omega)$ may be formed in a +y direction.

One end of the first signal conducting portion 911 is connected to a conductor 942, and another end of the first signal conducting portion 911 is connected to the capacitor 920. One end of the second signal conducting portion 912 is connected to the conductor 941, and another end of the second signal conducting portion 912 is connected to the capacitor 920. Accordingly, the first signal conducting portion 911, the second signal conducting portion 912, the ground conducting portion 913, and the conductors 941 and 942 are connected to each other so that the resonator 900 has a closed-loop electrical structure. The term "loop structure" may include a structure having any closed configuration, for example, a circular structure, a rectangular structure, a polygonal structure, and the like. "Having a loop structure" may indicate a closed-loop electrical structure.

As shown in FIG. 9, the capacitor 920 is inserted between the first signal conducting portion 911 and the second signal conducting portion 912. Specifically, the capacitor 920 is inserted into a space between the first signal conducting portion 911 and the second signal conducting portion 912. The capacitor 920 may be configured as a lumped element, a distributed element, or the like. In particular, a distributed capacitor configured as a distributed element may include zigzagged conductor lines and a dielectric material having a relatively high permittivity between the zigzagged conductor lines.

With the capacitor 920 being inserted into the transmission line, the resonator 900 may have a property of a metamaterial as discussed above in connection with the resonator 800 in FIG. 8.

When a capacitance of the capacitor 920 configured as a lumped element is appropriately determined, the resonator 900 may have a characteristic of the metamaterial. The resonator 900 may have a negative magnetic permeability by appropriately adjusting the capacitance of the capacitor 920, and therefore the resonator 900 may also be referred to as an MNG resonator 900. Various criteria may be applied to determine the capacitance of the capacitor 920. For example, the various criteria may include a criterion for enabling the resonator 900 to have a characteristic of the metamaterial, a criterion for enabling the resonator 900 to have a negative magnetic permeability at a target frequency, a criterion enabling the resonator 900 to have a zeroth order resonance characteristic at the target frequency, and the like. Based on at least one criterion among the aforementioned criteria, the capacitance of the capacitor 920 may be appropriately determined.

The resonator 900, also referred to as the MNG resonator 900, may have a zeroth order resonance characteristic of having a resonance frequency when a propagation constant is "0". If the resonator 900 has the zeroth order resonance characteristic, the resonance frequency is independent with respect to a physical size of the MNG resonator 900. By appropriately changing the capacitor 920, the resonance frequency of the MNG resonator 900 may be changed. Accordingly, the physical size of the MNG resonator 900 need not be changed to change the resonance frequency of the MNG resonator 900.

In a near field, the electric field is concentrated in the capacitor 920 inserted into the transmission line. Accordingly, due to the capacitor 920, the magnetic field becomes dominant in the near field. In particular, since the MNG resonator 900 having the zeroth-order resonance characteristic has characteristics similar to a magnetic dipole, the magnetic field becomes dominant in the near field. A relatively small electric field is produced by the insertion of the capacitor 920, and that small electric field is concentrated in the capacitor 920, so the magnetic field becomes even more dominant.

Also, the MNG resonator 900 includes the matcher 930 for impedance matching. The matcher 930 appropriately adjusts a strength of the magnetic field of the MNG resonator 900. An impedance of the MNG resonator 900 is determined by the matcher 930. A current may flow into the MNG resonator 900 via a connector 940, or may flow out of the MNG resonator 900 via the connector 940. The connector 940 is connected to the ground conducting portion 913 in FIG. 9, but may be connected to the matcher 930.

More specifically, as shown in FIG. 9, the matcher 930 is positioned within the loop formed by the loop structure of the resonator 900. The matcher 930 adjusts the impedance of the resonator 900 by changing the physical shape of the matcher 930. For example, the matcher 930 includes a conductor 931 for the impedance matching at a location separated from the ground conducting portion 913 by a distance h. The impedance of the resonator 900 is changed by adjusting the distance h.

Although not illustrated in FIG. 9, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may increase or decrease based on the control signal. Accordingly, the physical shape of the matcher 930 may be changed, whereby the impedance of the resonator 900 may be adjusted. The distance h between the conductor 931 of the matcher 930 and the ground conducting portion 913 may be adjusted using a variety of schemes. As one example, a plurality of conductors may be included in the matcher 930 and the distance h may be adjusted by adaptively activating one of the conductors. As another example, the distance h may be adjusted by adjusting the physical location of the conductor 931 up and down. The distance h may be controlled based on the control signal of the controller. The controller may generate the control signal using various factors.

As shown in FIG. 9, the matcher 930 may be configured as a passive element such as the conductor 931. Depending on an embodiment, the matcher 930 may be configured as an active element, such as a diode, a transistor, or the like. When the active element is included in the matcher 930, the active element may be driven based on the control signal generated by the controller, and the impedance of the resonator 900 may be adjusted based on the control signal. For example, a diode as the active element may be included in the matcher 930. The impedance of the resonator 900 may be adjusted depending on whether the diode is in an on state or in an off state under the control of the control signal.

Although not illustrated in FIG. 9, a magnetic core may pass through the resonator 900 configured as the MNG resonator. The magnetic core performs a function of increasing a power transmission distance.

Figure 10:
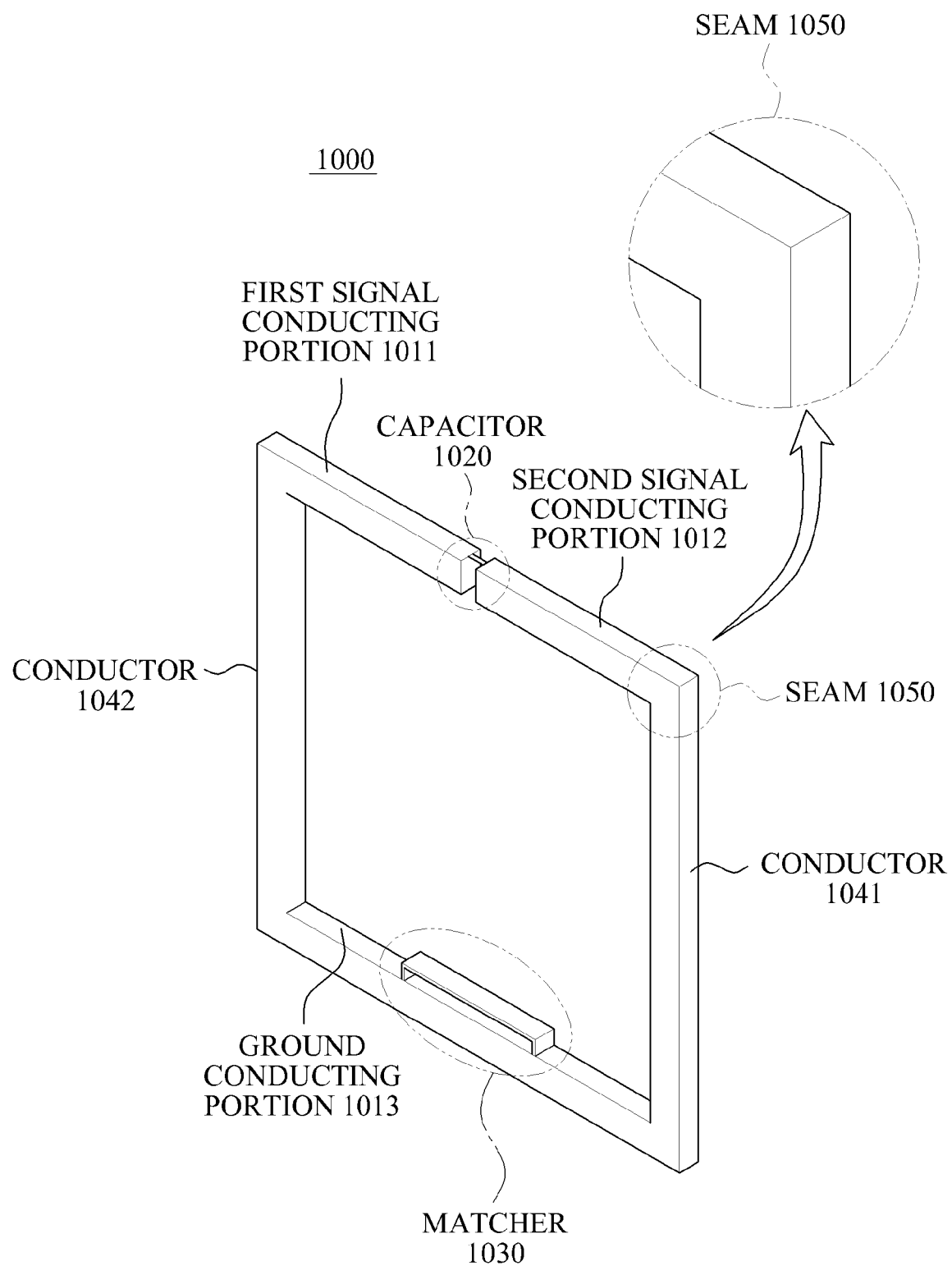

FIG. 10 illustrates an example of a resonator 1000 for wireless power transmission configured as a bulk type resonator.

Referring to FIG. 10, a first signal conducting portion 1011 and a conductor 1042 are connected to each other by being integrally formed as a single unit, instead of being separately manufactured and then connected to each other. Similarly, the second signal conducting portion 1012 and a conductor 1041 are also connected to each other by being integrally formed as a single unit.

If the second signal conducting portion 1012 and the conductor 1041 are separately manufactured and then connected to each other, a conductor loss may occur due to a seam 1050. To eliminate this conductor loss, the second signal conducting portion 1012 and the conductor 1041 are connected to each other without using a separate seam, that is, they are seamlessly connected to each other by being integrally formed as a single unit. Accordingly, it is possible to eliminate a conductor loss caused by the seam 1050. To achieve this same advantage, the first signal conducting portion 1011 and the conductor 1042 are seamlessly connected to each other by being integrally formed as a single unit. The unit formed by the first signal conducting portion 1011 and the conductor 1042 and the unit formed by the second signal conducting portion 1012 and the conductor 1041 may then be connected to the ground conducting portion 1013.

In order to further decrease conduction loss, the first signal conducting portion 1011, the conductor 1042, the ground conducting portion 1013, the conductor 1041, and the second signal conducting portion 1012 may be seamlessly and integrally manufactured as a single unit.

Referring to FIG. 10, a type of a seamless connection connecting at least two partitions into an integrated form is referred to as a bulk type connection.

The resonator 1000 further includes a capacitor 1020 inserted in series between the first signal conducting portion 1011 and the second signal conducting portion 1012, and a matcher 1030 for impedance matching.

Figure 11:
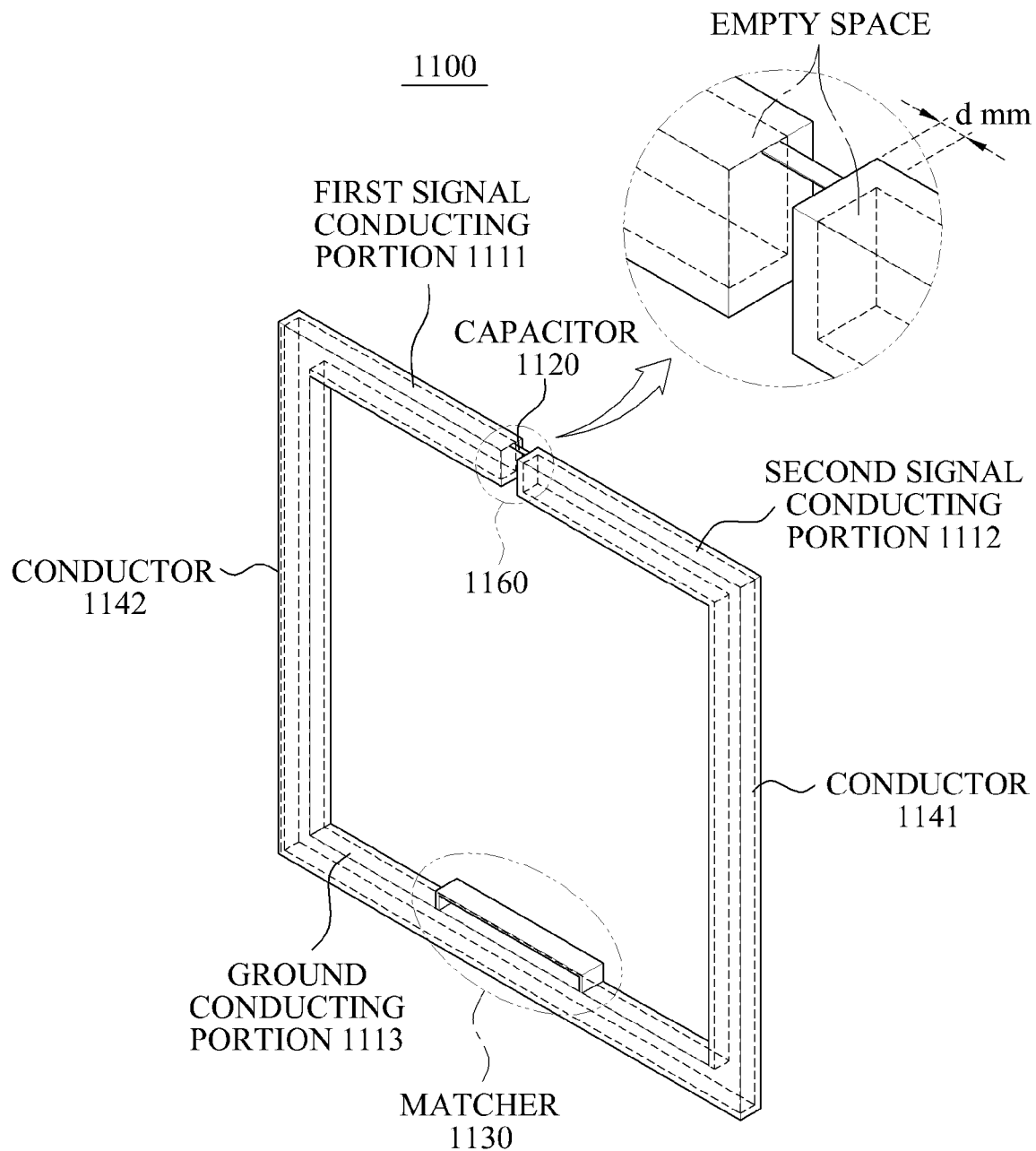

FIG. 11 illustrates an example of a resonator 1100 for wireless power transmission configured as a hollow type resonator.

Referring to FIG. 11, each of a first signal conducting portion 1111, a second signal conducting portion 1112, a ground conducting portion 1113, and conductors 1141 and 1142 of the resonator 1100 configured as the hollow type resonator include an empty space inside.

At a given resonance frequency, an active current may be modeled to flow in only a portion of the first signal conducting portion 1111 instead of all of the first signal conducting portion 1111, only a portion of the second signal conducting portion 1112 instead of all of the second signal conducting portion 1112, only a portion of the ground conducting portion 1113 instead of all of the ground conducting portion 1113, and only a portion of each of the conductors 1141 and 1142 instead of all of the conductors 1141 and 1142. Specifically, when a depth of each of the first signal conducting portion 1111, the second signal conducting portion 1112, the ground conducting portion 1113, and the conductors 1141 and 1142 is significantly deeper than a corresponding skin depth at the given resonance frequency, the portion significantly deeper than the skin depth is ineffective. The significantly deeper depth increases a weight and manufacturing costs of the resonator 1100.

Accordingly, at the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142 to be the same as or only slightly deeper than the corresponding skin depth. When each of the first signal conducting portion 1111, the second signal conducting portion 1112, the ground conducting portion 1113, and the conductors 1141 and 1142 has an appropriate depth the same as or only slightly deeper than a corresponding skin depth, the resonator 1100 becomes light, and manufacturing costs of the resonator 1100 decrease.

For example, as shown in an enlarged area 1160 in FIG. 11, the skin depth of the second signal conducting portion 1112 is d mm, with d being determined according to the following Equation 1, where f denotes a frequency, μ denotes a magnetic permeability, and σ denotes a conductivity:

$$d = \frac{1}{\sqrt{\pi f \mu \sigma}} \quad (1)$$

When the first signal conducting portion 1111, the second signal conducting portion 1112, the ground conducting portion 1113, and the conductors 1141 and 1142 are made of copper having a conductivity of $5.8 \times 10^7$ siemens per meter ($S \cdot m^{-1}$), the skin depth is about 0.6 mm at a resonance frequency of 10 Hz, and is about 0.006 mm at a resonance frequency of 100 MHz.

The resonator 1100 further includes a capacitor 1120 inserted in series between the first signal conducting portion 1111 and the second signal conducting portion 1112, and a matcher 1130 for impedance matching.

Figure 12:
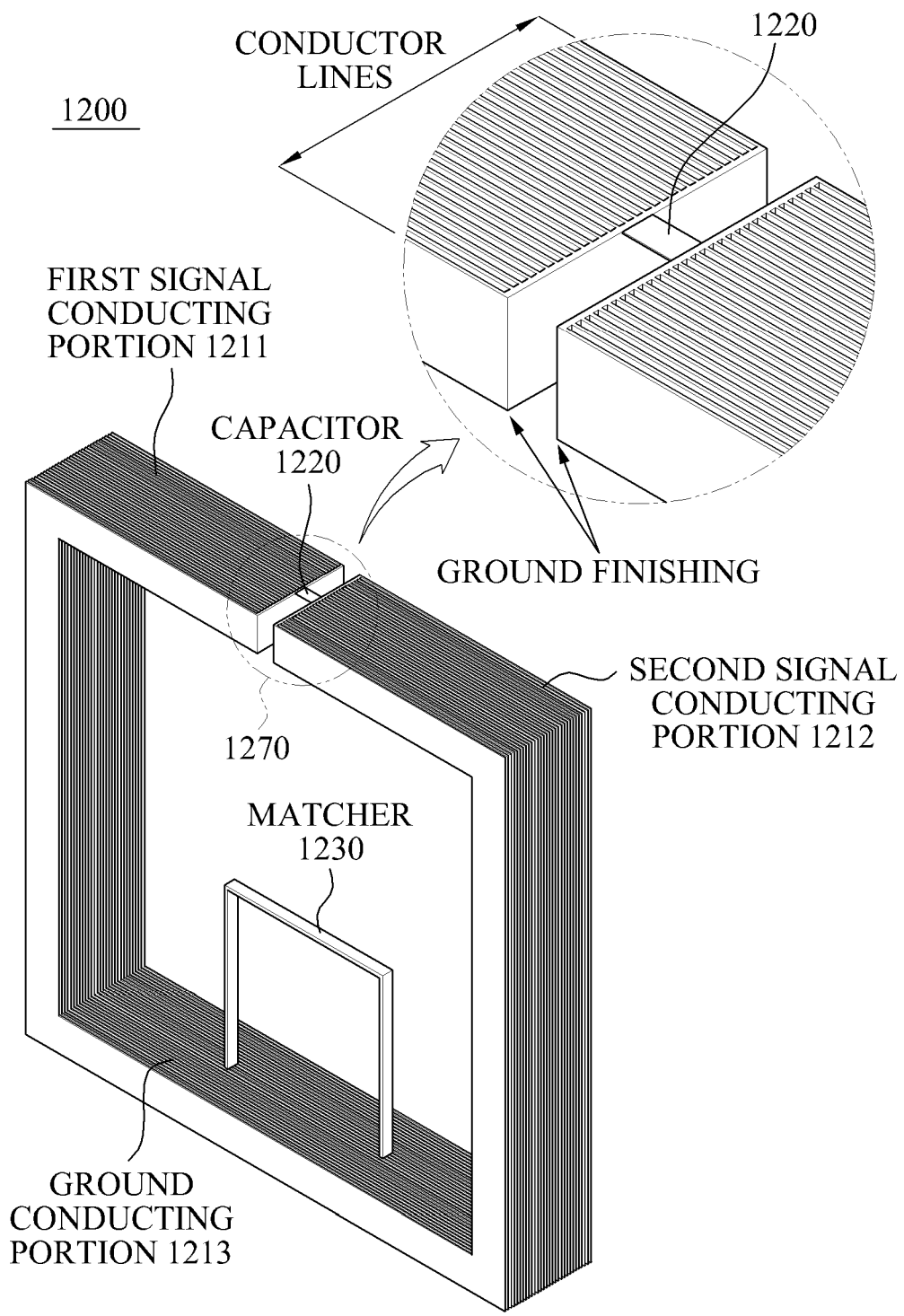

FIG. 12 illustrates an example of a resonator 1200 for wireless power transmission configured as a parallel-sheet type resonator.

Referring to FIG. 12, a first signal conducting portion 1211, a second signal conducting portion 1212, and a ground conducting portion 1213 included in the resonator 1200 are each configured as a plurality of parallel sheets.

The first signal conducting portion 1211, the second signal conducting portion 1212, and the ground conducting portion 1213 are typically made of a material that is not a perfect conductor, and therefore have a resistance. Due to the resistance, an ohmic loss occurs in the resonator 1200. The ohmic loss decreases a Q-factor and a coupling effect.

By configuring each of the first signal conducting portion 1211, the second signal conducting portion 1212, and the ground conducting portion 1213 as a plurality of parallel sheets, it is possible to decrease the ohmic loss, thereby increasing the Q-factor and the coupling effect. Referring to a portion 1270 indicated by a circle, each of the first signal conducting portion 1211, the second signal conducting portion 1212, and the ground conducting portion 1213 include a plurality of conductor lines configured as sheets disposed parallel to each other and shorted together at an end portion of each of the first signal conducting portion 1211 and the second signal conducting portion 1212. This causes a sum of resistances of the conductor lines to decrease. Consequently, the ohmic loss decreases, thereby increasing the Q-factor and the coupling effect.

The resonator 1200 further includes a capacitor 1220 inserted in series between the first signal conducting portion 1211 and the second signal conducting portion 1212, and a matcher 1230 for impedance matching.

Figure 13:
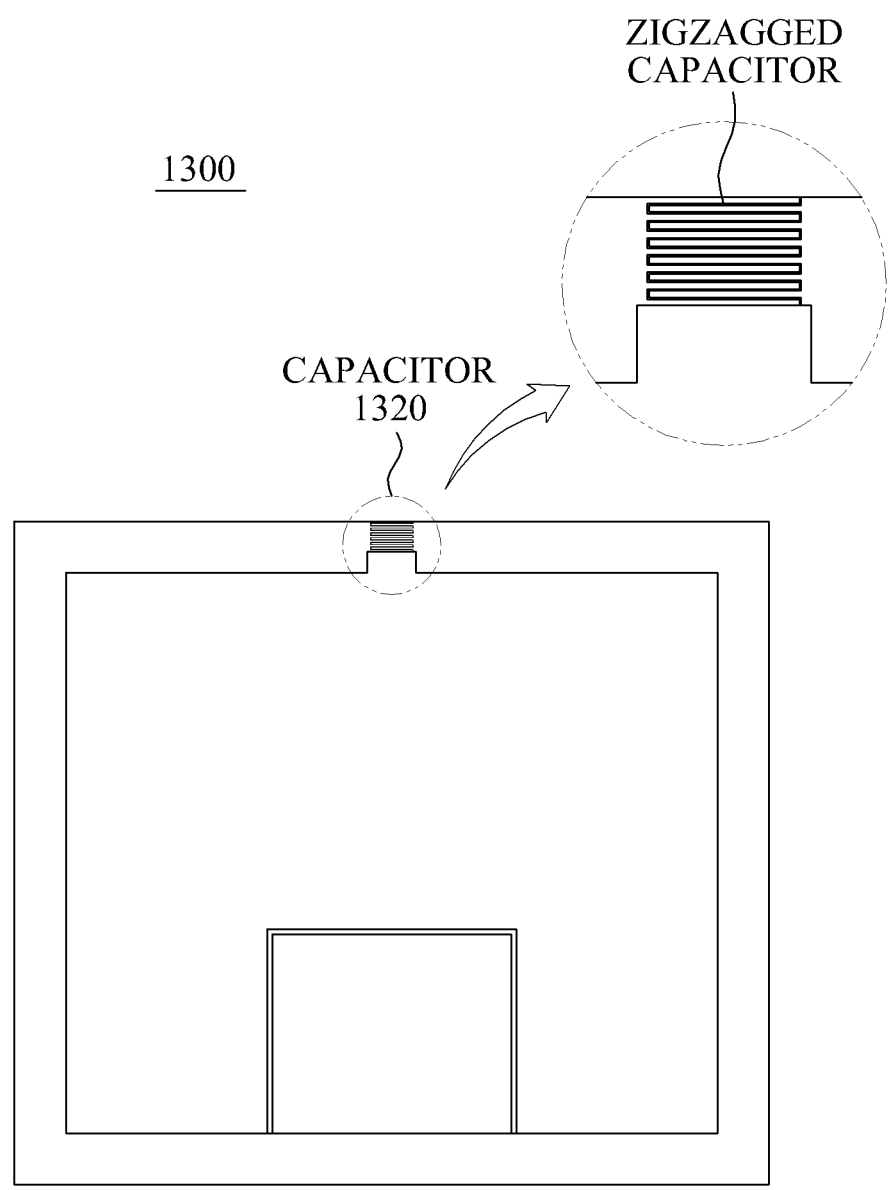

FIG. 13 illustrates an example of a resonator 1300 for wireless power transmission including a distributed capacitor.

Referring to FIG. 13, a capacitor 1320 included in the resonator 1300 for the wireless power transmission is configured as a distributed capacitor. A capacitor configured as a lumped element may have a relatively high equivalent series resistance (ESR). A variety of schemes have been proposed to decrease the ESR of the capacitor configured as a lumped element. According to an embodiment, by using the capacitor 1320 configured as a distributed element, it is possible to decrease the ESR. As is known in the art, a loss caused by the ESR decreases a Q-factor and a coupling effect.

As shown in FIG. 13, the capacitor 1320 configured as a distributed element has a zigzagged structure. For example, the capacitor 1320 configured as a distributed element may include zigzagged conductor lines and a dielectric material having a relatively high permittivity between the zigzagged conductor lines.

As shown in FIG. 13, by employing the capacitor 1320 configured as a distributed element, it is possible to decrease the loss occurring due to the ESR. In addition, by employing a plurality of capacitors configured as lumped elements connected in parallel, it is possible to decrease the loss occurring due to the ESR. Since a resistance of each of the parallel-connected capacitors configured as lumped elements decreases due to the parallel connection, active resistances of the parallel-connected capacitors configured as lumped elements also decrease, thereby decreasing the loss occurring due to the ESR. For example, by employing ten capacitors of 1 pF each connected in parallel instead of using a single capacitor of 10 pF, it is possible to decrease the loss occurring due to the ESR.

Figure 14A:
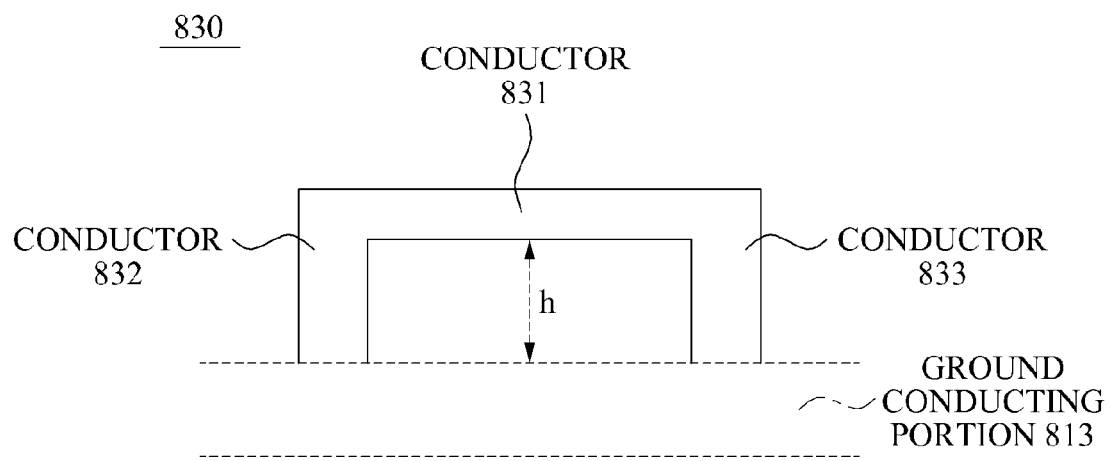
Figure 14B:
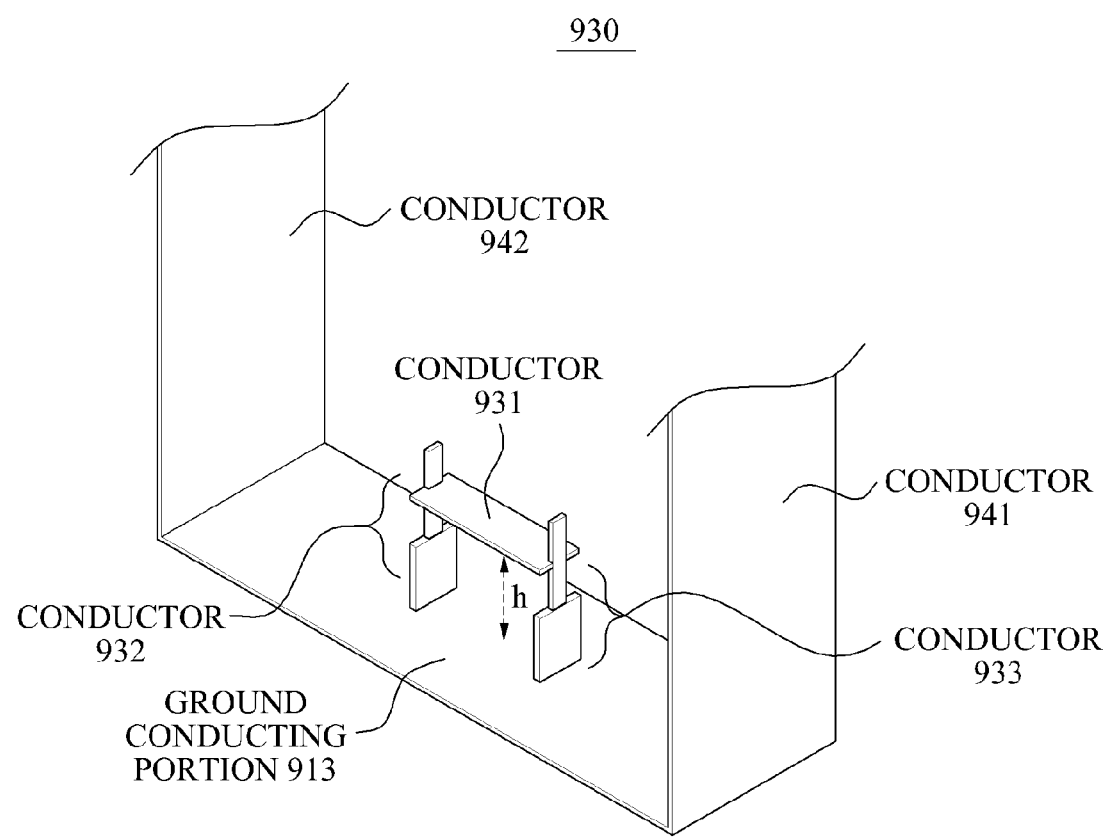

FIG. 14A illustrates an example of the matcher 830 used in the resonator 800 having the 2D structure of FIG. 8, and FIG. 14B illustrates an example of the matcher 930 used in the resonator 900 having the 3D structure of FIG. 9.

Specifically, FIG. 14A illustrates a portion of the 2D resonator of FIG. 8 including the matcher 830, and FIG. 14B illustrates a portion of the 3D resonator of FIG. 9 including the matcher 930.

Referring to FIG. 14A, the matcher 830 includes the conductor 831, a conductor 832, and a conductor 833. The conductors 832 and 833 are connected to the ground conducting portion 813 and the conductor 831. The impedance of the 2D resonator depends on a distance h between the conductor 831 and the ground conducting portion 813. The distance h between the conductor 831 and the ground conducting portion 813 may be controlled by the controller (not illustrated, but discussed above in connection with FIG. 8). The distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Referring to FIG. 14B, the matcher 930 includes the conductor 931, a conductor 932, and a conductor 933. The conductors 932 and 933 are connected to the ground conducting portion 913 and the conductor 931. The impedance of the 3D resonator depends on a distance h between the conductor 931 and the ground conducting portion 913. The distance h between the conductor 931 and the ground conducting portion 913 may be controlled by the controller (not illustrated, but discussed above in connection with FIG. 9). Similar to the matcher 830 included in the 2D structured resonator, in the matcher 930 included in the 3D structured resonator, the distance h between the conductor 931 and the ground conducting portion 913 may be adjusted using a variety of schemes. For example, the variety of schemes may include a scheme of adjusting the distance h by adaptively activating one of the conductors 931, 932, and 933, a scheme of adjusting the physical location of the conductor 931 up and down, and the like.

Although not illustrated in FIGS. 14A and 14B, the matcher may include an active element. An impedance of a resonator using the active element may be adjusted using a variety of schemes. For example, the variety of schemes may include a scheme of adjusting the impedance of the resonator by changing a path of a current flowing through the matcher using the active element.

Figure 15:
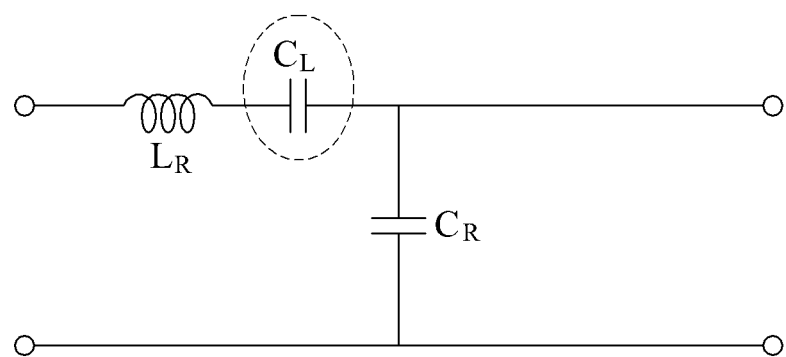
FIG. 15 is a diagram illustrating an example of an equivalent circuit of the resonator for wireless power transmission of FIG. 8.

FIG. 15 illustrates an example of an equivalent circuit of the resonator 800 for wireless power transmission of FIG. 8.

The resonator 800 for the wireless power transmission may be modeled as the equivalent circuit of FIG. 15. In the equivalent circuit of FIG. 15, $L_R$ denotes an inductance of the resonator, $C_R$ denotes a capacitance of the resonator 800, and $C_L$ denotes a capacitance of a capacitor configured as a lumped element inserted in the middle of the transmission line of FIG. 8.

The resonator 800 may have a zeroth resonance characteristic. For example, when a propagation constant is "0", the resonance frequency of the resonator 800 may be assumed to be $\omega_{MZR}$. The resonance frequency $\omega_{MZR}$ may be expressed by the following Equation 2:

$$\omega_{MZR} = \frac{1}{\sqrt{L_R C_L}} \qquad (2)$$

In Equation 2, MZR denotes a mu zero resonator. The capacitance $C_R$ of the resonator 800 is negligible compared to the capacitance $C_L$ of the capacitor configured as a lumped element, so it is omitted from Equation 2.

Referring to Equation 2, the resonance frequency $\omega_{MZR}$ of the resonator 800 depends on $L_R C_L$. A physical size of the resonator 800 and the resonance frequency $\omega_{MZR}$ are independent with respect to each other, and therefore the physical size of the resonator 800 may be reduced without changing the resonance frequency $\omega_{MZR}$.

Several examples of embodiments have been described above. Nevertheless, it should be understood that various modifications may be made in these examples. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. A high efficiency variable power transmitting apparatus comprising:
a variable power generating unit configured to output a variable power by modulating, with respect to a time axis, a high frequency signal having a constant amplitude by turning the high frequency signal ON and OFF, wherein the variable power generating unit comprises a modulated signal generating unit configured to generate a low frequency modulated signal having a duty cycle depending on the requested power level of the target device;
a power amplifier (PA) configured to amplify the variable power to satisfy a requested power level of a target device based on a power supply voltage having a predetermined level; and
a power supply configured to convert an alternating current (AC) voltage received from a power source to a direct current (DC) voltage, generate the power supply voltage having the predetermined level based on the DC voltage, and provide the power supply voltage having the predetermined level to the PA.

2. The apparatus of claim 1, further comprising a transmitting unit configured to transmit the amplified variable power to the target device through a transmission coil or an antenna.

3. The apparatus of claim 1, wherein the variable power generating unit comprises:
a high frequency signal generating unit configured to generate the high frequency signal having the constant amplitude; and
a switch controller configured to control ON and OFF states of a switch to modulate the high frequency signal based on the low frequency modulated signal to generate the variable power.

4. The apparatus of claim 1, wherein the variable power generating unit comprises:
a high frequency signal generating unit configured to generate the high frequency signal having the constant amplitude; and
digital logic processing unit configured to perform a logic operation to modulate the high frequency signal based on the low frequency modulated signal to generate the variable power.

5. The apparatus of claim 1, wherein the variable power generating unit comprises:
a high frequency signal generating unit configured to generate the high frequency signal having the constant amplitude; and
a controller configured to control operation of the high frequency signal generating unit based on the low frequency modulated signal to generate the variable power.

6. The apparatus of claim 5, wherein the modulated signal generating unit generates the low frequency modulated signal by performing delta-sigma modulation.

7. The apparatus of claim 1, wherein the power supply comprises a rectifying unit configured to rectify the AC voltage to generate the DC voltage.

8. The apparatus of claim 1, wherein the power supply comprises:
a transforming unit configured to transform the AC voltage received from the power source to an AC voltage having a level corresponding to a rated voltage of the PA; and
a rectifying unit configured to rectify the AC voltage having the level corresponding to the rated voltage of the PA to generate the DC voltage.

9. The apparatus of claim 1, wherein the PA is configured to operate in a switching mode or a saturated mode as an amplifier having a class selected from the group consisting of class D, class E, class F, class E/F, inverse class D, inverse class E, and inverse class F.

10. The apparatus of claim 1, wherein the PA comprises at least one power device selected from the group consisting of a gallium nitride (GaN) power device, a silicon carbide (SiC) power device, a lateral double diffused metal oxide semiconductor (LDMOS) power device, and a metal oxide semiconductor field effect transistor (MOSFET).

11. A high efficiency variable power transmitting apparatus comprising:
   a high frequency signal generating unit configured to generate a high frequency signal having a constant amplitude;
   a power amplifier (PA) configured to amplify the high frequency signal to satisfy a requested power level of a target device based on a variable power supply voltage; and
   a variable power supply configured to convert an alternating current (AC) voltage received from a power source to a direct current (DC) voltage, modulate the DC voltage with respect to a time axis by turning the DC voltage ON and OFF to generate the variable power supply voltage, and provide the variable power supply voltage to the PA;
   wherein the variable power supply comprises a modulated signal generating unit configured to generate a low frequency modulated signal having a duty cycle depending on the requested power level of the target device.

12. The apparatus of claim 11, wherein the variable power supply comprises:
   a rectifying unit configured to rectify the AC voltage to generate the DC voltage and
   a switch controller configured to control ON and OFF states of a switch to modulate the DC voltage based on the low frequency modulated signal to generate the variable power supply voltage.

13. The apparatus of claim 12, wherein the modulated signal generating unit generates the low frequency modulated signal by performing delta-sigma modulation.

14. The apparatus of claim 11, wherein the PA is configured to operate in a switching mode or a saturated mode as an amplifier having a class selected from the group consisting of class D, class E, class F, class E/F, inverse class D, inverse class E, and inverse class F.

15. The apparatus of claim 11, wherein the PA comprises at least one power device selected from the group consisting of a gallium nitride (GaN) power device, a silicon carbide (SiC) power device, a lateral double diffused metal oxide semiconductor (LDMOS) power device, and a metal oxide semiconductor field effect transistor (MOSFET).

16. A high efficiency variable power transmitting method comprising:
   converting an alternating current (AC) voltage received from a power source to a direct current (DC) voltage;
   generating a power supply voltage having a predetermined level based on the DC voltage;
   providing the power supply voltage having the predetermined level to a power amplifier (PA);
   outputting a variable power by modulating, with respect to a time axis, a high frequency signal having a constant amplitude by turning the high frequency signal ON and OFF,
   wherein the outputting comprises generating a low frequency modulated signal having a duty cycle depending on the requested power level of the target device; and
   amplifying, using the PA, the variable power to satisfy a requested power level of a target device based on the power supply voltage having the predetermined level.

17. The method of claim 16, wherein the outputting comprises:
   generating the low frequency signal having the constant amplitude; and
   controlling ON and OFF states of a switch to modulate the high frequency signal based on the low frequency modulated signal to generate the variable power.

18. The method of claim 16, wherein the outputting comprises:
   generating the high frequency signal having the constant amplitude; and
   performing a logic operation to modulate the high frequency signal based on the low frequency modulated signal to generate the variable power.

19. The method of claim 16, wherein the outputting of the variable power comprises:
   generating, using a high frequency signal generating unit, the high frequency signal having the constant amplitude; and
   controlling an operation of the high frequency signal generating unit based on the low frequency modulated signal to generate the variable power.

20. The method of claim 19, wherein the generating of the low frequency modulated signal comprises generating the low frequency modulated signal by performing delta-sigma modulation.

21. A high efficiency variable power transmitting method comprising:
   converting an alternating current (AC) voltage received from a power source to a direct current (DC) voltage;
   generating a variable power supply voltage by modulating the DC voltage with respect to a time axis by turning the DC voltage ON and OFF,
   wherein the generating of the variable power supply voltage comprises generating a low frequency modulated signal having a duty cycle depending on the requested power level of the target device;
   providing the variable power supply voltage to a power amplifier (PA);
   generating a high frequency signal having a constant amplitude; and
   amplifying, using the PA, the high frequency signal to satisfy a requested power level of a target device based on the variable power supply voltage.

22. The method of claim 21, wherein the generating of the variable power supply voltage comprises:
   controlling ON and OFF states of a switch to modulate the DC voltage based on the low frequency modulated signal to generate the variable power supply voltage.

23. The method of claim 22, wherein the generating of the low frequency modulated signal comprises generating the low frequency modulated signal by performing delta-sigma modulation.

24. A variable power transmitting apparatus comprising:
   a variable power generating unit configured to output a variable power by modulating, with respect to a time axis, a high frequency signal having a constant amplitude by turning the high frequency signal ON and OFF, and configured to output a high frequency signal having ON states and OFF states having a duty cycle depending on a requested power level of a target device, the high frequency signal having a constant amplitude during the ON states, wherein the variable power generating unit comprises:
a modulated signal generating unit configured to generate a low frequency modulated signal having a duty cycle depending on the requested power level of the target device;
a power supply configured to output a power supply voltage having a fixed predetermined level; and
a power amplifier (PA) operated by the power supply voltage having the fixed predetermined level and configured to amplify the high frequency signal to output a variable power satisfying the requested power level of the target device.

25. The apparatus of claim 24, further comprising a transmitting unit configured to transmit the variable power output from the PA to the target device through a transmission coil comprising a metamaterial or an antenna comprising a metamaterial.

26. The apparatus of claim 24, wherein the power supply is configured to convert an alternating current (AC) voltage to a direct current (DC) voltage having the fixed predetermined level, and provide the DC voltage to the PA as the power supply voltage having the fixed predetermined level.

27. The apparatus of claim 24, wherein the PA has a maximum efficiency when operated by the power supply voltage having the fixed predetermined level, and has an efficiency lower than the maximum efficiency when operated by a power supply voltage having a level other than the fixed predetermined level.

28. A variable power transmitting apparatus comprising:
a variable power generating unit configured to output a variable power by modulating, with respect to a time axis, a high frequency signal having a constant amplitude by turning the high frequency signal ON and OFF;
a high frequency signal generating unit configured to output a high frequency signal having ON states and OFF states having a duty cycle depending on a requested power level of a target device, the high frequency signal having a constant amplitude during the ON states;
a variable power supply configured to output a variable power supply voltage having ON states and OFF states having a duty cycle depending on a requested power level of a target device, the variable power supply voltage having a fixed predetermined level during the ON states,
wherein the variable power supply comprises a modulated signal generating unit configured to generate a low frequency modulated signal having a duty cycle depending on the requested power level of the target device; and
a power amplifier (PA) operated by the variable power supply voltage and configured to amplify the high frequency signal to output a variable power satisfying the requested power level of the target device.

29. The apparatus of claim 28, further comprising a transmitting unit configured to transmit the variable power output from the PA to the target device through a transmission coil comprising a metamaterial or an antenna comprising a metamaterial.

30. The apparatus of claim 28, wherein the power supply is configured to convert an alternating current (AC) voltage to a direct current (DC) voltage having the fixed predetermined level, turn the DC voltage ON and OFF according to the requested power level of the target device to generate the variable power supply voltage, and provide the variable power supply voltage to the PA.

31. The apparatus of claim 28, wherein the PA has a maximum efficiency when operated by a power supply voltage having the fixed predetermined level, and has an efficiency lower than the maximum efficiency when operated by a power supply voltage having a level other than the fixed predetermined level.

32. The apparatus of claim 1, wherein the variable power generating unit comprises:
a modulated signal generating unit configured to determine the durations of the ON and OFF states of the high frequency signal to generate a low frequency modulated signal.

33. The apparatus of claim 1, wherein the variable power generating unit comprises:
a modulated signal generating unit configured to determine a duty cycle that corresponds to the requested power level within in a predetermined period to generate a low frequency modulated signal,
wherein the length of the predetermined period determines how frequently the duty cycle of the low frequency modulated signal is updated by the modulated signal generating unit, and
wherein the length of the predetermined period determines how frequently the variable power generated by the variable power generating unit is updated.

* * * * *